US011753521B2

(12) United States Patent
Li et al.

(10) Patent No.: US 11,753,521 B2
(45) Date of Patent: Sep. 12, 2023

(54) ETHYLENE/ALPHA-OLEFIN INTERPOLYMER COMPOSITIONS WITH IMPROVED CONTINUOUS HIGH TEMPERATURE RESISTANCE

(71) Applicant: Dow Global Technologies LLC, Midland, MI (US)

(72) Inventors: Guang Ming Li, Sugar Land, TX (US); Raymond L. Laakso, Jr., St. Francisville, LA (US); Yuming Lai, Midland, MI (US); Xiaosong Wu, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 232 days.

(21) Appl. No.: 16/969,762

(22) PCT Filed: Feb. 14, 2019

(86) PCT No.: PCT/US2019/017943
§ 371 (c)(1),
(2) Date: Aug. 13, 2020

(87) PCT Pub. No.: WO2019/161013
PCT Pub. Date: Aug. 22, 2019

(65) Prior Publication Data
US 2020/0407532 A1 Dec. 31, 2020

Related U.S. Application Data

(60) Provisional application No. 62/630,452, filed on Feb. 14, 2018.

(51) Int. Cl.
*C08K 3/22* (2006.01)
*C08L 9/00* (2006.01)
(52) U.S. Cl.
CPC ............. *C08K 3/22* (2013.01); *C08L 9/00* (2013.01); *C08K 2003/222* (2013.01); *C08K 2003/2296* (2013.01)

(58) Field of Classification Search
CPC ............... C08K 3/22; C08K 2003/222; C08K 2003/2296; C08K 3/04; C08K 5/14; C08K 5/18; C08K 3/36; C08K 5/17; C08K 3/34; C08L 9/00; C08L 23/16; C08L 23/0815; C08L 2205/025; C08L 2205/03; C08L 2312/00; C08L 91/00; C08L 2205/035; C08L 23/12; C08L 83/04; C08L 2207/07; C08L 2308/00; C08F 210/18; C08F 2500/17; C08F 2/001; C08F 2/38; C08F 2/06; C08F 2420/05; C08F 2500/32; C08F 2500/34; C08F 4/65908; C08F 4/65927; C08F 210/06; C08F 236/20; C08F 2500/25; C08F 4/64193; C08F 2500/21; C08F 4/65912; C08F 2500/19; Y10T 428/139

USPC ........................................................ 524/432
See application file for complete search history.

(56) References Cited

U.S. PATENT DOCUMENTS

| | | | |
|---|---|---|---|
| 3,817,952 A | 6/1974 | Knabeschuh et al. | |
| 4,066,590 A * | 1/1978 | Eldred | C08K 13/02 524/343 |
| 5,023,006 A | 6/1991 | Davidson et al. | |
| 5,698,650 A | 12/1997 | Jourdain et al. | |
| 5,700,871 A | 12/1997 | Arjunan et al. | |
| 5,821,284 A | 10/1998 | Graham et al. | |
| 9,096,740 B2 | 8/2015 | Baldovino et al. | |
| 9,096,741 B1 | 8/2015 | Nieten et al. | |
| 2001/0031816 A1 | 10/2001 | Nakano | |
| 2003/0149147 A1 | 8/2003 | Graf et al. | |
| 2010/0016482 A1* | 1/2010 | Heck | C08L 23/12 524/197 |
| 2015/0210838 A1 | 7/2015 | Wu et al. | |
| 2016/0355622 A1 | 12/2016 | Ichino et al. | |
| 2017/0362474 A1* | 12/2017 | Zou | C09J 11/06 |

FOREIGN PATENT DOCUMENTS

| | | |
|---|---|---|
| CA | 1334694 C | 3/1995 |
| CN | 103319792 A | 9/2013 |
| CN | 105330990 | 2/2016 |
| EP | 101175 B1 | 10/1986 |
| EP | 1433812 | 6/2004 |
| EP | 1676879 A2 | 7/2006 |
| EP | 2011823 | 1/2009 |
| EP | 2308725 | 4/2011 |
| WO | 2000043445 A3 | 11/2000 |
| WO | 2005123833 | 12/2005 |
| WO | 2008091847 | 7/2008 |
| WO | 2011008837 | 1/2011 |
| WO | 2017019235 | 2/2017 |

OTHER PUBLICATIONS

Arjunan, "Compatibilzation of CR/EPM blends for power transmission belt application" Rubber World, Feb. 1997.
Dominic, "Overview of Automotive Wire and Cable and Recent Advances," ACS Rubber Division Spring Technical Meeting, 1998, Paper No. 32.
Ferradino, "Antioxidant Selection for Peroxide Cure Elastomer Applications," Rubber Chemistry and Technology, 2003, p. 704, vol. 76.
Ohm, "Optimizing the Heat Resistance of EPDM and NBR," ACS Rubber Division Fall technical meeting, 2000, p. 1-20, Paper No. 99.

(Continued)

*Primary Examiner* — Frances Tischler

(57) ABSTRACT

A composition comprising at least the following components: A) one or more ethylene/alpha-olefin interpolymers, which comprise ≤3.5 wt % of a non-conjugated diene, based on the weight of the one or more ethylene/alpha-olefin interpolymers; B) an acid acceptor selected from the following: MgO, ZnO, or combination thereof.

18 Claims, No Drawings

(56) References Cited

OTHER PUBLICATIONS

Sinha, "Cure, Antidegradant Use Better Hose, Belt Compounds," Rubber News, 2001, pp. 23-34, vol. 30.
Tao, "Heat Resistant Elastomers", Rubber Chemistry and Technology, 2005, p. 489, vol. 78.
PCT/US2019/017943, International Search Report dated Apr. 17, 2019.
PCT/US2019/017943, Written Opinion of the International Searching Authority dated Apr. 17, 2019.

* cited by examiner

ETHYLENE/ALPHA-OLEFIN INTERPOLYMER COMPOSITIONS WITH IMPROVED CONTINUOUS HIGH TEMPERATURE RESISTANCE

CROSS-REFERENCE TO RELATED APPLICATIONS

This application claims priority to U.S. Provisional Application No. 62/630,452, filed on Feb. 14, 2018, which is incorporated herein by reference in its entirety.

BACKGROUND OF THE INVENTION

Automotive and industrial requirements for thermoset rubber articles have undergone dramatic changes over the past decade. The compact and sophisticated designs for automotive under the hood compartments (for example, under the hood coolant hose, and wire & cable components) have led to increased temperature environments and durability requirements. To improve the continuous, upper temperature resistance of a thermoset rubber is a challenging task, due to these more stringent design criteria. Industrial applications have followed similar trends, involving higher service temperatures and extended service life periods. Consequently, many automotive and industrial applications now require rubber formulations that have high temperature performance and long-term heat and weather resistance.

EPDM-based formulations are described in the following references: WO2000/043445, WO2008/091847; EP101175B1; EP1433812A1; EP1676879A2; EP2308725; U.S. Pat. No. 3,817,952; CA1334694C; D. P. Sinha et al, "Cure, antidegradant use better hose, belt compounds", Rubber News (June, 2001); K. Dominic et al, "Overview of Automotive Wire and Cable and Recent Advances," ACS Rubber Division Spring Technical Meeting, 1998, Paper No. 32; "Rubber Technology: Compounding and Testing for Performance" by John Dick, Chapter 6, "Elastomer Selection," (2009, hanser); Anthony G. Ferradino, Rubber Chemistry and Technology, Vol. 76, pp 704 (2003); P. Arjunan et al, "Compatibilzation of CR/EPM blends for power transmission belt application" Rubber World, (February, 1997); Z. Tao, et al, "Heat Resistant Elastomers", Rubber Chemistry and Technology (2005, V 78, pp 489); R. Ohm, et al., "Optimizing the Heat Resistance of EPDM and NBR," ACS Rubber Division Fall technical meeting, 2000, Paper No. 99. Additional formulations are disclosed in the following references: U.S. Pat. Nos. 5,023,006; 5,700,871; 5,821,284; 9,096,740; 9,096,741; EP1756217A1; EP2011823A1 and WO2017/019235.

Typical EPDM-based formulations contain of EPDM rubber(s), fillers, plasticizers, rubber additives, and a curing package. With a proper cure system and the selection of other ingredients (i.e., type and amount of antioxidant, fillers, and plasticizers), it is possible to achieve high heat resistance up to 125° C. for an EPDM-based formulation. However, a higher heat resistance at 150° C. remains a major challenge for many EPDM rubber manufacturers. Thus, there remains a need for EPDM-based formulations and other elastomer formulations that have higher high temperature heat resistance, for example, ≥150° c. There is a further need for such formulations for use in applications where the long term high temperature heat resistance is critical. These needs have been met by the following invention.

SUMMARY OF THE INVENTION

A composition comprising at least the following components:
A) one or more ethylene/alpha-olefin interpolymers, which comprise ≤3.5 wt % of a non-conjugated diene, based on the weight of the one or more ethylene/alpha-olefin interpolymers;
B) an acid acceptor selected from the following: MgO, ZnO, or combination thereof.

DETAILED DESCRIPTION

A composition comprising at least the following components:
A) one or more ethylene/alpha-olefin interpolymers, which comprise ≤3.5 wt %, or ≤3.4 wt %, or ≤3.2 wt %, or ≤3.0 wt %, or ≤2.8 wt %, or ≤2.6 wt %, or ≤2.4 wt %, or ≤2.2 wt % of a non-conjugated diene, based on the weight of the one or more ethylene/alpha-olefin interpolymers (or based on the weight of component A);
B) an acid acceptor selected from the following: MgO, ZnO, or a combination thereof.

An inventive composition may comprise a combination of two or more embodiments described here. Component A may comprise a combination of two or more embodiments described here. Component B may comprise a combination of two or more embodiments described here.

In one embodiment, or a combination of embodiments described herein, the weight ratio of component A to component B is from 2.0 to 25, or from 3.0 to 20, or from 4.0 to 15, or from 5.0 to 10.

In one embodiment, or a combination of embodiments described herein, the one or more ethylene/alpha-olefin interpolymers comprise ≤2.0 wt %, or ≤1.8 wt %, or ≤1.6 wt %, or ≤1.4 wt %, or ≤1.2 wt %, or ≤1.0 wt % of a non-conjugated diene, based on the weight of the one or more ethylene/alpha-olefin interpolymers (or based on the weight of component A). In one embodiment, or a combination of embodiments described herein, the one or more ethylene/alpha-olefin interpolymers comprise ≤0.9 wt %, or ≤0.8 wt %, or ≤0.7 wt %, or ≤0.6 wt %, or ≤0.5 wt %, or ≤0.4 wt %, or ≤0.3 wt % of a non-conjugated diene, based on the weight of the one or more ethylene/alpha-olefin interpolymers (or based on the weight of component A).

In one embodiment, or a combination of embodiments described herein, the one or more ethylene/alpha-olefin interpolymers comprises greater than 0 wt %, or ≥0.05 wt %, or ≥0.1 wt % of a non-conjugated diene, based on the weight of the one or more ethylene/alpha-olefin interpolymers (or based on the weight of component A).

In one embodiment, or a combination of embodiments described herein, the composition meets the following relationship: $\{[-10 \text{ (wt \%)}^{-1}*(\text{diene in wt \% (based on wt of component A)} -0.9 \text{ wt \%})] + [3 \text{ (phr)}^{-1}*(\text{acid acceptor in phr} -9 \text{ phr})]\} > 0$, or ≥1.0, or ≥2.0, or ≥3.0, or ≥4.0, or ≥5.0, or ≥6.0, or ≥7.0, or ≥8.0, or ≥9.0, or ≥10; wherein each wt % is based on the weight of component A, and each phr is based on 100 weight parts of component A. In a further embodiment, the acid acceptor is MgO. In a further embodiment, the diene is ENB. In one embodiment, or a combination of embodiments described herein, the composition meets the following relationship: $\{[-10 \text{ (wt \%)}^{-1}*(\text{diene in wt \% (based on wt of component A)} -0.9 \text{ wt \%})] + [3 \text{ (phr)}^{-1}*(\text{acid acceptor in phr} -9 \text{ phr})]\} \leq 40$. or ≤35, or ≤30; wherein each wt % is based on the weight of component A, and each phr is based on 100 weight parts of component A.

In a further embodiment, the acid acceptor is MgO. In a further embodiment, the diene is ENB.

In one embodiment, or a combination of embodiments described herein, component A has a density from 0.850 g/cc to 0.910 g/cc, or from 0.855 g/cc to 0.900 g/cc, or from 0.860 g/cc to 0.890 g/cc, or from 0.860 g/cc to 0.880 g/cc (1 g/cc=1 g/cm$^3$).

In one embodiment, or a combination of embodiments described herein, component A has a Mooney Viscosity (ML 1+4, 125° C.) from 5 to 100, or from 10 to 95, or from 15 to 90. In one embodiment, or a combination of embodiments described herein, the component A has a Mooney Viscosity (ML 1+4, 125° C.) from 20 to 100, or from 30 to 95, or from 40 to 90.

In one embodiment, or a combination of embodiments described herein, component A is present in an amount from 20 wt % to 55 wt %, or from 25 wt % to 50 wt %, or from 30 wt % to 45 wt %, or from 32 wt % to 42 wt % based on the weight of the composition.

In one embodiment, or a combination of embodiments described herein, component A comprises an ethylene/alpha-olefin/diene interpolymer. In a further embodiment, the ethylene/alpha-olefin/diene interpolymer is an EPDM, and further the diene is ENB In one embodiment, or a combination of embodiments described herein, the ethylene/alpha-olefin/diene interpolymer is present in an amount ≥95 wt %, or ≥98 wt %, or ≥99 wt %, based on the weight of component A. In one embodiment, or a combination of embodiments described herein, the ethylene/alpha-olefin/diene interpolymer has a "% Peak Area (from 21.3 to 22.0 ppm)"≥3.0%, or ≥4.0%, or ≥5.0%, or ≥6.0%, or ≥7.0%, or ≥8.0%, or ≥9.0% or ≥10%, or ≥11%, or ≥12%, or ≥13%, or ≥14%, or ≥15%, or ≥16%, or ≥17%, or ≥18%, or ≥19% or ≥20%, as determined by 13C NMR (propylene tacticity marker), as described herein. In one embodiment, or a combination of embodiments described herein, the ethylene/alpha-olefin/diene interpolymer has a "% Peak Area (from 21.3 to 22.0 ppm)"≤40%, or ≤35%, or ≤30%, as determined by 13C NMR, as described herein.

In one embodiment, or a combination of embodiments described herein, component A comprises an ethylene/alpha-olefin/diene interpolymer, and an ethylene/alpha-olefin copolymer, and further an ethylene/C3-C8 alpha-olefin copolymer. In a further embodiment, the ethylene/alpha-olefin/diene interpolymer is an EPDM, and further the diene is ENB. In one embodiment, or a combination of embodiments described herein, the sum weight of the ethylene/alpha-olefin/diene interpolymer and the ethylene/alpha-olefin copolymer is ≥95 wt %, or ≥98 wt %, or ≥99 wt %, based on the weight of component A. In one embodiment, or a combination of embodiments described herein, the weight ratio of the ethylene/alpha-olefin/diene interpolymer to the ethylene/alpha-olefin copolymer is from 1.0 to 5.0, or from 1.0 to 4.0, or from 1.0 to 3.0, or from 1.0 to 2.0, or from 1.0 to 1.5. In one embodiment, or a combination of embodiments described herein, the ethylene/alpha-olefin/diene interpolymer has a "% Peak Area (from 21.3 to 22.0 ppm)"≥3.0%, or ≥4.0%, or ≥5.0%, or ≥6.0%, or ≥7.0%, or ≥8.0%, or ≥9.0% or ≥10%, or ≥11%, or ≥12%, or ≥13%, or ≥14%, or ≥15%, or ≥16%, or ≥17%, or ≥18%, or ≥19% or ≥20%, as determined by 13C NMR (propylene tacticity marker), as described herein. In one embodiment, or a combination of embodiments described herein, the ethylene/alpha-olefin/diene interpolymer has a "% Peak Area (from 21.3 to 22.0 ppm)"≤40%, or ≤35%, or ≤30%, as determined by 13C NMR (propylene tacticity marker), as described herein. In one embodiment, or a combination of embodiments described herein, the ethylene/alpha-olefin copolymer has a PRR value ≥4.0, or ≥5.0, or ≥6.0, or ≥7.0, or ≥8.0 or ≥9.0, or ≥10.0; where PRR=RR+[3.82−interpolymer Mooney Viscosity (ML$_{1+4}$ at 125° C.)]×0.3, and where RR (Rheology Ratio)=V$_{0.1}$/V$_{100}$, and V$_{0.1}$ is the viscosity at 0.1 rad/sec and 190° C., and V$_{100}$ is the viscosity at 100 rad/sec and 190° C. In one embodiment, or a combination of embodiments described herein, the ethylene/alpha-olefin copolymer has a PRR value ≤80, or ≤70, or ≤60, or ≤50, or ≤40 or ≤30. See International Publication WO00/26268.

In one embodiment, or a combination of embodiments described herein, component A comprises an ethylene/alpha-olefin/diene interpolymer and a second ethylene/alpha-olefin/diene interpolymer that is different in one or more of the following properties wt % diene (based on the weight of the interpolymer), wt % ethylene (based on the weight of the interpolymer), and/or Mooney Viscosity (ML 1+4, 125° C.). In a further embodiment, each ethylene/alpha-olefin/diene interpolymer is, independently, an EPDM, and further each diene an ENB. In one embodiment, or a combination of embodiments described herein, the sum weight of the two ethylene/alpha-olefin/diene interpolymers is ≥95 wt %, or ≥98 wt %, or ≥99 wt %, based on the weight of component A. In one embodiment, or a combination of embodiments described herein, the weight ratio of the ethylene/alpha-olefin/diene interpolymer to the second ethylene/alpha-olefin copolymer is from 1.0 to 5.0, or from 1.0 to 4.0, or from 1.0 to 3.0, or from 1.0 to 2.0, or from 1.0 to 1.5. In one embodiment, or a combination of embodiments described herein, each ethylene/alpha-olefin/diene interpolymer, independently, has a "% Peak Area (from 21.3 to 22.0 ppm"≥3.0%, or ≥4.0%, or ≥5.0%, or ≥6.0%, or ≥7.0%, or ≥8.0%, or ≥9.0% or ≥10%, or ≥11%, or ≥12%, or ≥13%, or ≥14%, or ≥15%, or ≥16%, or ≥17%, or ≥18%, or ≥19% or ≥20%, as determined by 13C NMR (propylene tacticity marker), as described herein. In one embodiment, or a combination of embodiments described herein, each ethylene/alpha-olefin/diene interpolymer, independently, has a "% Peak Area (from 21.3 to 22.0 ppm)"≤40%, or ≤35%, or ≤30%, as determined by 13C NMR, as described herein.

In one embodiment, or a combination of embodiments described herein, component A comprises an ethylene/alpha-olefin copolymer, and further the alpha-olefin of the ethylene/-alpha-olefin copolymer is a C3-C10, or a C4-C8 alpha-olefin. In one embodiment, or a combination of embodiments described herein, the ethylene/alpha-olefin copolymer is present in an amount ≥95 wt %, or ≥98 wt %, or ≥99 wt %, based on the weight of component A. In one embodiment, or a combination of embodiments described herein, the ethylene/alpha-olefin copolymer has a PRR value ≥4.0, or ≥5.0, or ≥6.0, or ≥7.0, or ≥8.0 or ≥9.0, or ≥10.0; where PRR=RR+[3.82−interpolymer Mooney Viscosity (ML$_{1+4}$ at 125° C.)]×0.3, and where RR (Rheology Ratio)=V$_{0.1}$/V$_{100}$, and V$_{0.1}$ is the viscosity at 0.1 rad/sec and 190° C., and V$_{100}$ is the viscosity at 100 rad/sec and 190° C. In one embodiment, or a combination of embodiments described herein, the ethylene/alpha-olefin copolymer has a PRR value ≤80, or ≤70, or ≤60, or ≤50, or ≤40 or ≤30. See International Publication WO00/26268.

In one embodiment, or a combination of embodiments described herein, acid acceptor of component B is MgO. In one embodiment, or a combination of embodiments described herein, acid acceptor of component B is ZnO. In one embodiment, or a combination of embodiments described herein, acid acceptor of component B is MgO and ZnO.

In one embodiment, or a combination of embodiments described herein, component B is present in an amount from 1 to 50 phr, or from 2 to 45 phr, or from 4 to 40 phr, or from 6 to 30 phr, or from 8 to 25 phr, or from 10 to 20 phr based on 100 parts of component A.

In one embodiment, or a combination of embodiments described herein, component B is present in an amount from 2.0 to 10.0 wt %, or from 2.2 to 9.5 wt %, from 2.4 to 9.0 wt %, from 2.6 to 8.5 wt %, from 2.8 to 8.0 wt %, from 3.0 to 7.5 wt %, from 3.2 to 7.0 wt %, based on the weight of the composition.

In one embodiment, or a combination of embodiments described herein, the composition further comprises ≥3.0 wt %, or ≥3.5 wt % of two antioxidants, a first antioxidant and a second antioxidant, based on the weight of the composition. In one embodiment, or a combination of embodiments described herein, the composition further comprises ≤6.0 wt %, or ≤5.5 wt % of two antioxidants, based on the weight of the composition. In a further embodiment, the weight ratio of the first antioxidant to the second antioxidant is from 0.20 to 0.80, or from 0.30 to 0.70, or from 0.40 to 0.60. In one embodiment, or a combination of embodiments described herein, the first antioxidant is selected from the following: a quinolone polymerized 1,2-dihydro-2,2-4-trimethylquinoline, an amine (p-p-dicumyl-diphenylamine), a hindered phenol (tetrakis (methylene (3,5-di-t-butyl-4-hydroxyhydrocinnamate)) methane, or a dithiocarbamate (nickel dimethyldithiocarbamate). In one embodiment, or a combination of embodiments described herein, the second antioxidant is selected from the following: mercaptotoluimidazole, or zinc-2-mercaptotoluimidazole.

In one embodiment, or a combination of embodiments described herein, the composition further comprises ≥2.0 wt %, or ≥2.5 wt % of a curing agent, based on the weight of the composition. In one embodiment, or a combination of embodiments described herein, the composition further comprises ≤6.0 wt %, or ≤5.5 wt % of a curing agent, based on the weight of the composition. In a further embodiment, the curing agent is a peroxide.

In one embodiment, or a combination of embodiments described herein, the composition further comprises a filler, such as, for example, carbon black. In a further embodiment, the composition comprises from 20 wt % to 50 wt %, or from 25 wt % to 45 wt % of the filler, such as carbon black, based on the weight of the composition. Other fillers include fillers: calcium carbonate, clay, talc, silica, titanium dioxide, diatomaceous earth.

In one embodiment, or a combination of embodiments described herein, the composition further comprises an oil, such as, for example, a paraffinic oil, or a naphthenic oil. In a further embodiment, the oil is present in an amount from 8.0 wt % to 32 wt %, or from 10 wt % to 30 wt %, or from 12 wt % to 28 wt % based on the weight of the composition.

In one embodiment, or a combination of embodiments described herein, the composition comprises from 30 wt % to 50 wt %, or from 32 wt % to 48 wt %, or from 35 wt % to 46 wt % of the sum weight of component A and component B, based on the weight of the composition. In a further embodiment, the weight ratio of component A to component B is from 3.0 to 30, or from 4.0 to 15, or from 5.0 to 10.

In one embodiment, or a combination of embodiments described herein, the composition comprises ≤1.00 wt %, or ≤0.50 wt %, or ≤0.10 wt %, or ≤0.05 wt % of a styrene-based polymer (comprises a majority amount of polymerized styrene, based on the weight of the polymer). In a further embodiment, the composition does not comprises a styrene-based polymer. In one embodiment, or a combination of embodiments described herein, the composition comprises ≤1.00 wt %, or ≤0.50 wt %, or ≤0.10 wt %, or ≤0.05 wt % of a styrene-block copolymer rubber. In a further embodiment, the composition does not comprises a styrene-block copolymer rubber. In one embodiment, or a combination of embodiments described herein, the composi-tion comprises ≤1.00 wt %, or ≤0.50 wt %, or ≤0.10 wt %, or ≤0.05 wt % of a styrene-butadiene rubber. In a further embodiment, the composition does not comprises a styrene-butadiene rubber.

In one embodiment, or a combination of embodiments described herein, the composition comprises ≤1.00 wt %, or ≤0.50 wt %, or ≤0.10 wt %, or ≤0.05 wt % of a polybutadiene. In a further embodiment, the composition does not comprises a polybutadiene. In one embodiment, or a combination of embodiments described herein, the composition comprises ≤1.00 wt %, or ≤0.50 wt %, or ≤0.10 wt %, or ≤0.05 wt % of a polyisoprene. In a further embodiment, the composition does not comprises a polyisoprene.

In one embodiment, or a combination of embodiments described herein, the composition comprises ≤1.00 wt %, or ≤0.50 wt %, or ≤0.10 wt %, or ≤0.05 wt % of a polypropylene homopolymer. In a further embodiment, the composition does not comprises a polypropylene homopolymer. In one embodiment, or a combination of embodiments described herein, the composi-tion comprises ≤1.00 wt %, or ≤0.50 wt %, or ≤0.10 wt %, or ≤0.05 wt % of a propylene/ethylene copolymer, comprises a majority amount of polymerized propylene, based on the weight of the polymer, and ethylene, as the only monomer types). In a further embodiment, the composition does not comprises a such propylene/ethylene copolymer. In one embodiment, or a combination of embodiments described herein, the composition comprises ≤1.00 wt %, or ≤0.50 wt %, or ≤0.10 wt %, or ≤0.05 wt % of a propylene/alpha-olefin copolymer, comprises a majority amount of polymerized propylene, based on the weight of the polymer, and an alpha-olefin, as the only monomer types). In a further embodiment, the composition does not comprises a such propylene/alpha-olefin copolymer.

In one embodiment, or a combination of embodiments described herein, the composition comprises ≤1.00 wt %, or ≤0.50 wt %, or ≤0.10 wt %, or ≤0.05 wt % of a perfluoroalkyl compound (a compound that comprises at least one perfluoroalkyl group). In a further embodiment, the composition does not comprises a perfluoroalkyl compound. In one embodiment, or a combination of embodiments described herein, the composi-tion comprises ≤1.00 wt %, or ≤0.50 wt %, or ≤0.10 wt %, or ≤0.05 wt % of an antimony oxide. In a further embodiment, the composition does not comprises an antimony oxide. In one embodiment, or a combination of embodiments described herein, the composi-tion comprises ≤1.00 wt %, or ≤0.50 wt %, or ≤0.10 wt %, or ≤0.05 wt % of an ammonium sulfate. In a further embodiment, the composition does not comprises an ammonium sulfate.

In one embodiment, or a combination of embodiments described herein, the composition has a Tensile Strength (before aging)≥6.0 MPa, or ≥6.5 MPa, or ≥7.0 MPa, ≥7.5 MPa, or ≥8.0 MPa, or ≥8.5 MPa, or ≥9.0 MPa. In one embodiment, or a combination of embodiments described herein, the composition has an Elongation at break (before aging)≥250%, or ≥300%, or ≥350%, or ≥400%, or ≥450%, or ≥500%.

In one embodiment, or a combination of embodiments described herein, the composition, after 504 hours (3 weeks) at 150° C., in air, retains ≥60%, or ≥65%, or ≥70%, or ≥75%, or ≥80%, or ≥85% of its original Tensile Strength, and retains ≥60%, or ≥66%, or ≥70%, or ≥75%, or ≥80%, or ≥85%, or ≥90% of its original Elongation at break. The original Tensile Strength is the value obtained at room temperature, before the sample is subjected to a heat aging at 150° C. The original Elongation at break is the value obtained at room temperature, before the sample is subjected to a heat aging at 150° C.

In one embodiment, or a combination of embodiments described herein, the composition, after 1008 hours (6 weeks) at 150° C., in air, retains ≥40%, or ≥45%, or ≥50%, or ≥55%, or ≥60%, or ≥65% of its original Tensile Strength, and retains ≥25%, or ≥30%, or ≥35%, or ≥40%, or ≥45%, or ≥50%, or ≥55% of its original Elongation at break. The original Tensile Strength is the value obtained at room temperature, before the sample is subjected to a heat aging at 150° C. The original Elongation at break is the value obtained at room temperature, before the sample is subjected to a heat aging at 150° C.

In one embodiment, or a combination of embodiments described herein, the composition, after 1008 hours (6 weeks), at 150° C., in air, retains from 35% to 95%, or from 40% to 95%, or from 42% to 88% of its original Tensile Strength, and retains from 25% to 90%, or from 30% to 85%, or from 35% to 80%, or from 40% to 75% of its original Elongation at break.

In one embodiment, or a combination of embodiments described herein, the composition has an increase in Shore A Hardness from 55 to 80, of from 60 to 75, or from 65 to 70. In one embodiment, or a combination of embodiments described herein, the composition, after 1008 hours (6 weeks), at 150° C., in air, has an increase in Shore A Hardness from 5.0% to 24%, of from 6.0% to 23%, or from 7.0% to 22%.

Also is provided a crosslinked composition comprising the composition of one or more embodiments described herein.

Also is provided an article comprising at least one component formed from the composition of one or more embodiments described herein. In one embodiment, or a combination of embodiments described herein, the article is selected from the group consisting of the following: injection molded parts, foams, automotive parts, building and construction materials, building and construction materials, and shoe components. In one embodiment, or a combination of embodiments described herein, the article is selected from the group consisting of the following: hoses, belts, and gaskets. An inventive article may comprise a combination of two or more embodiments as described herein.

Component A

Component A is a composition comprising at least one ethylene/alpha-olefin inter-polymer. Component A may comprise two ethylene/alpha-olefin interpolymers.

In an embodiment, or a combination of embodiments described herein, component A comprises an amount of ethylene from 50 to 90 wt %, or from 50 to 80 wt %, or from 50 to 70 wt %, based on the weight of component A. In an embodiment, or a combination of embodiments described herein, component A comprises diene in an amount from greater than zero to 1.0 wt %, or from 0.05 to 1.0 wt %, or from 0.10 to 1.0 wt %, based on the weight of component A.

In an embodiment, or a combination of embodiments described herein, component A has a weight average molecular weight (Mw(conv))≥150,000, or ≥160,000, or ≥170,000, or ≥180,000, or ≥190,000, or ≥200,000 or ≥210,000, or ≥220,000, or ≥230,000 g/mol. In an embodiment, or a combination of embodiments described herein, the least one ethylene/-alpha-olefin interpolymer of component A has a weight average molecular weight (Mw)≤600,000, or ≤500,000, or ≤400,000, or ≤350,000, or ≤300,000, g/mol.

In an embodiment, or a combination of embodiments described herein, component A has a molecular weight distribution (Mw(conv)/Mn(conv))≥3.50, or ≥3.70, or ≥3.90, or ≥4.00, or ≥4.20, or ≥4.40, or ≥4.50. In an embodiment, or a combination of embodiments described herein, the least one ethylene/alpha-olefin inter-polymer of component A has a molecular weight distribution (Mw(conv)/Mn(conv))≤6.50, or ≤6.20≤6.10, or ≤6.00.

In one embodiment, or a combination of embodiments described herein, component A has a "% Peak Area (from 21.3 to 22.0 ppm)"≥3.0%, or ≥4.0%, or ≥5.0%, or ≥6.0%, or ≥7.0%, or ≥8.0%, or ≥9.0% or ≥10%, or ≥11%, or ≥12%, or ≥13%, or ≥14%, or ≥15%, or ≥16%, or ≥17%, or ≥18%, or ≥19% or ≥20%, as determined by 13C NMR (propylene tacticity marker), as described herein. In one embodiment, or a combination of embodiments described herein, component A has a "% Peak Area (from 21.3 to 22.0 ppm)"≤40%, or ≤35%, or ≤30%, as determined by 13C NMR, as described herein.

In one embodiment, or a combination of embodiments described herein, component A has a Mooney viscosity (ML(1+4) at 125° C.)≥10, or ≥15, or ≥20, or ≥25, or ≥30, or ≥35. In one embodiment, or a combination of embodiments described herein, the least one ethylene/alpha-olefin inter-polymer of component A has a Mooney viscosity (ML(1+4) at 125° C.)≤100, or ≤90, or ≤80, or ≤70. Mooney viscosity is that of the interpolymer without a filler and without an oil unless otherwise noted.

In one embodiment, or a combination of embodiments described herein, component A has a tan delta (0.1 rad/sec, 190° C.) value ≤1.5, or ≤1.25, or ≤1.00, and ≥0, or ≥0.20 or ≥0.50, or ≥0.70, or ≥0.90. In one embodiment, or a combination of embodiments described herein, the least one ethylene/alpha-olefin inter-polymer of component A has a tan delta (0.1 rad/sec, 190° C.) value ≥0.50 or ≥0.60, or ≥0.70, or ≥0.80.

In one embodiment, or a combination of embodiments described herein, component A has a viscosity (V0.1 rad/sec, 190° C.) of ≥50,000, or ≥60,000, or ≥70,000, or ≥80,000, or ≥90,000, or ≥150,000, or ≥175,000, or ≥200,000. In an embodiment, or a combination of embodiments described herein, the least one ethylene/alpha-olefin inter-polymer of component A has a viscosity (V0.1 rad/sec, 190° C.) of ≤500,000, or ≤450,000, or ≤400,000, or ≤350,000, or ≤300,000, or ≤200,000, or ≤150,000, or ≤120,000, or ≤110,000. In a further embodiment, component A comprises one interpolymer, and further an EPDM.

In one embodiment, or a combination of embodiments described herein, component A has a viscosity ratio (V0.1 rad/sec, 190° C./V100 rad/sec, 190° C.) from 20 to 115, or from 25 to 110, or from 30 to 105, or from 35 to 100, or from 40 to 95.

In one embodiment, or a combination of embodiments described herein, component A has a density ≤0.910, or ≤0.905, or ≤0.900, or ≤0.895, or ≤0.890, or ≤0.885, or ≤0.880, or ≤0.875, or ≤0.870 g/cc. In one embodiment, or a combination of embodiments described herein, the least one ethylene/alpha-olefin inter-polymer of component A has a density ≥0.850 g/cc. or ≥0.855, or ≥0.860 g/cc (1 cc=1 cm$^3$).

The component A may comprise a combination of two or more embodiments described herein. The least one ethylene/alpha-olefin interpolymer of may comprise a combination of two or more embodiments described herein.

Ethylene/α-Olefin/Diene Interpolymers

Each ethylene/α-olefin/diene interpolymer of component A, independently comprises, in polymerized form, ethylene, an α-olefin, and a diene. The α-olefin may be either an aliphatic or an aromatic compound. In an embodiment, the α-olefin is a $C_3$-$C_{20}$ aliphatic compound, preferably a $C_3$-$C_{16}$ aliphatic compound, and more preferably a $C_3$-$C_{10}$ aliphatic compound. Preferred $C_3$-$C_{10}$ aliphatic α-olefins are selected from the group consisting of propylene, 1-butene, 1-hexene and 1-octene, and more preferably propylene.

Suitable examples of dienes include the $C_4$-$C_{40}$ nonconjugated dienes. Illustrative nonconjugated dienes include straight chain acyclic dienes such as 1,4-hexadiene and 1,5-heptadiene; branched chain acyclic dienes such as 5-methyl-1,4-hexadiene, 2-methyl-L5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododadiene; multi-ring alicyclic fused and bridged ring dienes, such as tetrahydroindene, methyl tetrahydroindene; alkenyl, alkylidene, cycloalkenyl and cycloalkyli-dene norbomenes such as 5-methylene-2-norbomene (MNB), 5-ethylidene-2-norbomene (ENB), 5-vinyl-2-norbornene, 5-propenyl-2-norbomene, 5-isopropylidene-2-norbomene, 5-(4-cyclopentenyl)-2-norbornene, and 5-cyclohexylidene-2-norbomene. In an embodiment, the diene is a nonconjugated diene selected from the group consisting of ENB, dicyclopentadiene, 1,4-hexadiene, 7-methyl-1,6-octadiene. In embodiments, the diene is ENB.

In one embodiment, or a combination of embodiments described herein, each ethylene/α-olefin/diene interpolymer, independently, comprises a majority amount of polymerized ethylene, based on the weight of the interpolymer.

In one embodiment, or a combination of embodiments described herein, each ethylene/α-olefin/diene interpolymer is an ethylene/α-olefin/diene terpolymer (EAODM). In a further embodiment, the interpolymer is an ethylene/propylene/diene terpolymer (EPDM) terpolymer. In a further embodiment, the diene is 5-ethylidene-2-norbornene (ENB).

An ethylene/α-olefin/nonconjugated diene interpolymer may comprise a combination of two or more embodiments described herein. An EPDM terpolymer may comprise a combination of two or more embodiments as described herein.

Additives and Applications

A composition may comprise one or more additives, such as oils, crosslinking (or vulcanizing) agents, fillers, antioxidants, flame retardants, foaming agents, colorants or pigments, and thermoplastic polymers, among others. In one embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550. An oil may comprise a combination of two or more embodiments as described herein.

Illustrative crosslinking/vulcanizing agents include, but are not limited to sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; azo-compounds; silanes, such as vinyl tri-ethoxy or vinyl tri-methoxy silane; dinitroso compounds, such as p-quinone-dioxime and p,p'-dibenzoylquinone-dioxime; phenol-formaldehyde resins containing hydroxymethyl or halomethyl functional groups; and other types of radical generators (e.g. N—O break type and C—C break type), among others. The suitability of any of these crosslinking/vulcanizing agents for use in the invention is well known to those skilled in the compounding arts. In an embodiment, the crosslinking/vulcanizing agent comprises a sulfur-containing compound.

Additional additives include, but are not limited to, fillers, flame retardants, colorants or pigments, thermoplastic polymers, and combinations thereof. Such additives can be employed in a desired amount to achieve their desired effect. Suitable fillers include, but are not limited to, clay, talc, or carbon black. In one embodiment, or a combination of embodiments described herein, the inventive composition further comprises at least one antioxidant. Illustrative antioxidants include, but are not limited to, peroxy and alkoxy radical traps (amines and hindered phenols), hydroperoxide decomposers, and synergist.

In one embodiment, or a combination of embodiments described herein, an inventive composition further comprises a thermoplastic polymer. Illustrative polymers, include, but not limited to, propylene-based polymers, ethylene-based polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

The compositions of the present invention may be used to prepare a variety of articles, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes. Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list. The compositions are especially suitable for use in an engine coolant hose.

Definitions

Unless stated to the contrary, implicit from the context, or customary in the art, all parts and percents are based on weight, and all test methods are current as of the filing date of this disclosure. The term "composition" and like terms, as used herein, means a mixture or blend of two or more materials which comprise the composition, as well as reaction products and decomposition products formed from the materials of the composition.

The transitions (or terms) "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated into and/or within the polymer. The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

The term "ethylene-based polymer" and like terms, as used herein, refers to a polymer that comprises, in polymerized form, 50 wt % or a majority weight percent of ethylene monomer (based on the weight of the polymer), and optionally may comprise one or more comonomers).

"Ethylene/α-olefin/diene interpolymer" and like terms, as used herein, refers to a polymer that comprises, in polymerized form, ethylene, an α-olefin, and a diene (for example, a non-conjugated diene). In one embodiment, the "ethylene/α-olefin/diene interpolymer" comprises a majority weight percent of ethylene (based on the weight of the interpolymer).

"Ethylene/α-olefin interpolymer" and like terms, as used herein, refers to a polymer that comprises, in polymerized form, ethylene, and an α-olefin. The interpolymer may optionally comprise a non-conjugated diene. In one embodiment, the "ethylene/α-olefin interpolymer" comprises a majority weight percent of ethylene (based on the weight of the interpolymer).

"Ethylene/α-olefin copolymer" and like terms, as used herein, refers to a copolymer that comprises, in polymerized form, 50 wt % or a majority of ethylene, based on the weight of the copolymer, and an α-olefin as the only monomer types.

TEST METHODS

Mooney Viscosity

Mooney Viscosity (ML1+4 at 125° C.) of an interpolymer (e.g., ethylene/α-olefin/diene interpolymer or polymer blend, was measured in accordance with ASTM 1646-04, using a large rotor, with a one minute preheat time and a four minute rotor operation time. The instrument was an Alpha Technologies Mooney Viscometer 2000.

Mooney Viscosity (ML1+4 at 100° C.) of a composition (formulation) was measured in accordance with ASTM 1646-04, using a large rotor, with a one minute preheat time and a four minute rotor operation time. The instrument was an Alpha Technologies Mooney Viscometer 2000.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: Mpolyethylene=A×(Mpolystyrene)B, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

13C NMR Method for EPDM Composition Analysis and Tacticity (% mm)

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temp. CryoProbe. The data was acquired using "160 scans per data file," a six second pulse repetition delay, with a sample temperature of 120° C. The acquisition was carried out using a spectral width of 25,000 Hz and a file size of 32K data points. NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3^*molesP - 7^*molesENB)}{2} \qquad \text{Eqn. 1}$$

$$molesENB = CH3 \ (13.6 - 14.7 \ ppm) \qquad \text{Eqn. 2}$$

$$molesP = CH3 \ (19.5 - 22.0 \ ppm) \qquad \text{Eqn. 3}$$

$$\text{mole \% ethylene} = \frac{100 * molesE}{molesE + molesP + molesENB} \quad \text{Eqn. 4}$$

$$\text{mole \% propylene} = \frac{100 * molesP}{molesE + molesP + molesENB} \quad \text{Eqn. 5}$$

$$\text{mole \% } ENB = \frac{100 * molesENB}{molesE + molesP + molesENB} \quad \text{Eqn. 6}$$

$$\text{Wt \% ethylene} = \frac{100 * \text{mole \%} E * 28}{\text{mole \%} E^* 28 + \text{mole \%} P^* 42 + \text{mole \%} ENB^* 120} \quad \text{Eqn. 7}$$

$$\text{Wt \% propylene} = \frac{100 * \text{mole \%} P * 42}{\text{mole \%} E^* 28 + \text{mole \%} P^* 42 + \text{mole \%} ENB^* 120} \quad \text{Eqn. 8}$$

$$\text{Wt \% } ENB = \frac{100 * \text{mole \%} ENB * 120}{\text{mole \%} E^* 28 + \text{mole \%} P^* 42 + \text{mole \%} ENB^* 120} \quad \text{Eqn. 9}$$

Propylene Tacticity % mm Area 13C NMR

The 13C NMR spectral analysis of the EPDM samples was used to quantitate the level of tacticity % mm. The NMR was performed in a "50/50 mixture of tetrachloroethane-d2/orthodichlorobenzene," as described above. An NMR spectral analysis (see above) of the inventive EPDMs displayed a significant "% Peak Area from 21.3 ppm-22.0 ppm [rmmr, mmmr, mmmm]," typically greater than 3.5% of the total integral area from 19.5 ppm to 22.0 ppm. Peak responses in this region typically are related to differences in propylene tacticity (% mm) that have been incorporated into the EPDM. A similar analysis can be done for another type of ethylene/α-olefin/diene interpolymer. Spectral data were referenced to the EEE backbone (three or more repeating units of polymerized ethylene) at 30 ppm. Thus, "% Peak Area (from 21.3 ppm-22.0 ppm)"={[(area from 21.3 ppm to 22.0 ppm)/(total integral area from 19.5 ppm to 22.0 ppm)]× 100}.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range from 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio of the viscosity at 0.1 rad/sec to the viscosity at 100 rad/sec (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation was used to estimate the RR of a polymer (RRPolymer) from the RR value of a polymer containing oil (RROE_Polymer):

RRPolymer=RROE_Polymer/(wt % oil*(−0.01988)+ 1.0321).

Compression Set

Compression set was measured according to ASTM D395 at 23° C. and 100° C. Disks of "29 mm (±0.5 mm)" in diameter and "12.7 (±0.5 mm)" thickness were punched from compression molded plaques, prepared as described under the section of compression molding (see Experimental section). Each button sample was inspected for notches, uneven thickness and inhomogeneity, and selected buttons (without those defects) were tested. Compression set was performed on two specimens for each sample, at the temperatures specified, and the average of the two specimens reported. The button sample was placed in the compressive device having two metal plates, which could be pressed together, and locked into place at 75% of the original height of the button sample. The compressive device, with the compressed samples, was then placed in an oven, and equilibrated at the test temperature for a specified time (22 hrs at 23° C. or 100° C.). In this test, the stress was released at the test temperature, and the thickness of the sample was measured after 30 min. equilibration period at room temperature. Compression set is a measured of the degree of recovery of a sample following compression, and is calculated according to the equation $CS=(H_0-H_2)/(H_0-H_1)$; where $H_0$ is the original thickness of the sample, $H_1$ is the thickness of the spacer bar used, and $H_2$ is the final thickness of the sample after removal of the compressive force.

Tensile Stress—Strain Properties

Tensile properties were measured using die cut, small dog bone shaped micro tensile test specimens, having the dimensions described in ASTM D-1708. The die cut specimens were cut from the compression molded plaques which were prepared as described under the compression molding section (see the Experimental section). Tensile properties (tensile strength and elongation) were measured, at room temp., following the method ASTM D-412, in the machine direction of an INSTRON MODEL 1122, made by INSTRUMET.

Some non-limiting embodiments of the present disclosure are as follows:

1. A composition comprising at least the following components:
   A) one or more ethylene/alpha-olefin interpolymers, which comprise ≤3.5 wt % of a non-conjugated diene, based on the weight of the one or more ethylene/alpha-olefin interpolymers;
   B) an acid acceptor selected from the following: MgO, ZnO, or combination thereof.

2. The composition of embodiment 1, wherein the one or more ethylene/alpha-olefin interpolymers comprise ≤2.0 wt %, or ≤1.8 wt %, or ≤1.6 wt %, or ≤1.4 wt %, or ≤1.2 wt %, or ≤1.0 wt % of a non-conjugated diene, based on the weight of the one or more ethylene/alpha-olefin interpolymers.

3. The composition of embodiment 1 or embodiment 2, wherein the weight ratio of component A to component B is from 2.0 to 25, or from 2.5 to 20, or from 3 to 17, or from 4 to 12.5, or from 5 to 10.

4. The composition of anyone of the previous embodiments, wherein the composition meets the following relationship: {[−10 (wt %)$^{-1}$*(diene in wt % (based on wt of component A)−0.9 wt %)]+[3 (phr)$^{-1}$*(acid acceptor in phr−9 phr)]}≥0.

5. The composition of anyone of the previous embodiments, wherein the composition meets the following relationship: {[−10 (wt %)$^{-1}$*(diene in wt % (based on wt of component A)−0.9 wt %)]+[3 (phr)$^{-1}$*(acid acceptor in phr−9 phr)]}≤40.

6. The composition of anyone of the previous embodiments, wherein the density of component A ranges from 0.850 to 0.910 g/cc.

7. The composition of anyone of the previous embodiments, wherein the Mooney Viscosity (ML 1+4, 125° C.) of component A ranges from 10M to 150 MU, or from 20 MU to 130 MU, or from 30 MU to 110 MU, or from 40 MU to 90 MU.

8. The composition of anyone of the previous embodiments, wherein component A is present in an amount from 20 wt % to 55 wt %, based on the weight of the composition.

9. The composition of anyone of the previous embodiments, component A comprises an ethylene/alpha-olefin/diene interpolymer.

10. The composition of embodiment 9, wherein the ethylene/alpha-olefin/diene interpolymer is an EPDM.

11. The composition of embodiment 9 or embodiment 10, wherein the ethylene/alpha-olefin/diene interpolymer is present in an amount ≥95 wt %, or ≥98 wt %, or ≥99 wt %, based on the weight of component A.

12. The composition of anyone of embodiments 1-8, wherein the component A comprises an ethylene/alpha-olefin/diene interpolymer and an ethylene/alpha-olefin copolymer.

13. The composition of embodiment 12, wherein the weight ratio of the ethylene/alpha-olefin/diene interpolymer to the ethylene/alpha-olefin copolymer is from 1.0 to 5.0, or from 1.0 to 4.0, or from 1.0 to 3.0, or from 1.0 to 2.0, or from 1.0 to 1.5.

14. The composition of embodiment 12 or embodiment 13, wherein the ethylene/alpha-olefin/diene interpolymer is an EPDM.

15. The composition of anyone of embodiments 12-14, wherein the sum weight of the ethylene/alpha-olefin/diene interpolymer and the ethylene/alpha-olefin copolymer is ≥95 wt %, or ≥98 wt %, or ≥99 wt %, based on the weight of component A.

16. The composition of anyone of embodiments 1-8, wherein component A comprises an ethylene/alpha-olefin/diene interpolymer and a second ethylene/alpha-olefin/diene interpolymer that is different in one or more of the following properties wt % diene (based on the weight of the interpolymer), wt % ethylene (based on the weight of the interpolymer), and/or Mooney Viscosity (ML 1+4, 125° C.).

17. The composition of embodiment 16, wherein the weight ratio of the ethylene/alpha-olefin/diene interpolymer to the second ethylene/alpha-olefin/diene terpolymer is from 1.0 to 5.0, or from 1.0 to 4.0, or from 1.0 to 3.0, or from 1.0 to 2.0, or from 1.0 to 1.5.

18. The composition of embodiment 16 or embodiment 17, wherein each ethylene/alpha-olefin/diene interpolymer is, independently, an EPDM.

19. The composition of anyone of embodiments 16-18, wherein the sum weight of the two ethylene/alpha-olefin/diene interpolymers is ≥95 wt %, or ≥98 wt %, or ≥99 wt %, based on the weight of component A.

20. The composition of anyone of embodiments 1-8, wherein component A comprises an ethylene/alpha-olefin copolymer.

21. The composition of embodiment 20, wherein the alpha-olefin of the ethylene/alpha-olefin copolymer is a C3-C10 alpha-olefin.

22. The composition of embodiment 20 or embodiment 21, wherein the ethylene/alpha-olefin copolymer is present in an amount ≥95 wt %, or ≥98 wt %, or ≥99 wt %, based on the weight of component A.

23. The composition of anyone of the previous embodiments, wherein the acid acceptor is present in an amount from 2.0 to 10.0 wt %, based on the weight of the composition.

24. The composition of anyone of the previous embodiments, wherein the acid acceptor of component B is MgO or ZnO, and further MgO.

25. The composition of anyone of the previous embodiments, wherein the composition comprises ≥3.0 wt % of amine type of antioxidants and synergistic antioxidant, based on the weight of the composition, wherein the amine type of antioxidant is 4,4'-Bis (alpha, alpha-dimethyl-benzyl) diphenylamine and synergistic antioxidant is 2-mercaptotoluimidazole or zinc 2-mercaptotoluimidazole.

26. The composition of anyone of the previous embodiments, wherein the composition comprises ≥2.0 wt % of a peroxide curing agent, based on the weight of the composition.

27. The composition of anyone of the previous embodiments, wherein the composition comprises of carbon black.

28. The composition of embodiment 27, wherein the carbon black is present in an amount from 20 wt % to 50 wt %, based on the weight of the composition.

29. The composition of any of the previous embodiments, wherein the composition further comprises an oil.

30. The composition of embodiment 29, wherein the oil is present in an amount from 8.0 wt % to 40 wt %, based on the weight of the composition.

31. The first composition of any of the previous embodiments, wherein the composition comprises from 30 wt % to 50 wt % of the sum weight of component A and component B, based on the weight of the composition.

32. The composition of anyone of the previous embodiments, wherein the composition has a Tensile Strength ≥5 MPa.

33. The composition of anyone of the previous embodiments, wherein the composition has an Elongation at Break ≥250%.

34. The composition of any one of the previous embodiments, wherein the composition, after 1008 hours (6 weeks), at 150° C., in air, retains ≥35% of its original Tensile Strength, and retains ≥25% of its original elongation.

35. The composition of any one of the previous embodiments, wherein the composition, after 1008 hours (6 weeks), at 150° C., in air, retains from 35% to 95% of its original Tensile Strength, and retains from 25% to 90% of its original elongation.

36. A crosslinked composition comprising the composition of any one of the previous embodiments.

37. An article comprising at least one component formed from the composition of anyone of the previous embodiments.

EXPERIMENTAL

Representative Synthesis of First Composition—Continuous Polymerization

The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3).

The polymer composition was produced in a solution polymerization process using a continuous stir-tanked reactor followed by loop reactor. Ethylene was introduced in a mixture of a solvent of ISOPAR E (available from Exxon-Mobil), propylene was introduced and 5-ethylidene-2-norbornene (ENB) was introduced, each forming a reactor feed stream. Catalyst was fed to each the reactor separately, and activated in-situ using co-catalyst 1 and co-catalyst 2. The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent, such as hydrogen.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. See also U.S. Pat. Nos. 5,977,251 and 6,545,088 for further descriptions of the polymerization reactors. Polymerization conditions are listed in Tables 1 and 2.

TABLE 1

| | | Reaction Conditions | | | |
|---|---|---|---|---|---|
| Example | Reactor Temp. [degC] | Pressure [psig] | Solvent/ Ethylene Feed Ratio [lb/lb] | Propylene/ Ethylene Feed Ratio [lb/lb] | ENB/ Ethylene Feed Ratio [lb/lb] |
| EPDM01-R1 (first reactor) | 125.7 | 750 | 10.3 | 0.99 | 0.04 |
| EPDM01 (second reactor) | 125.0 | 725 | 6.29 | 1.63 | 0.01 |
| EPDM02-R1 (first reactor) | 141.7 | 737 | 9.56 | 1.00 | 0.02 |
| EPDM02 (second reactor) | 139.9 | 726 | 13.4 | 0.40 | 0.01 |

TABLE 2

| | | | Reaction Conditions | | | |
|---|---|---|---|---|---|---|
| Example | Catalyst | H2 mol % | C2 Conc. [g/L] | Catalyst Efficiency [lb_poly/b_metal]*10E6 | Borate/Cat. Metal Ratio [mol/mol] | Al/Cat. Metal Ratio [mol/mol] |
| EPDM01-R1 (first reactor) | Catalyst-1 | 0.11 | 23.0 | 12.8 | 1.9 | 32.3 |
| EPDM01 (second reactor) | Catalyst-1 | 0.20 | 10.3 | 13.8 | 2.0 | 5.1 |
| EPDM02-R1 (first reactor) | Catalyst-2 | 0.01 | 22.2 | 0.84 | 2.0 | 9.9 |
| EPDM02 (second reactor) | Catalyst-2 | 2.17 | 6.2 | 0.59 | 2.0 | 10.0 |

Catalyst-1 is [[6,6'''-((2R,4S)-pentane-2,4-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)]] (2-)]-zirconium dimethyl.

Catalyst-2 is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2)]-hafnium dimethyl.

Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in USP 5,919,988 (Ex. 2).

Cocatalyst-2 (modified methylalumoxane (MMAO)) was purchased from Akzo Nobel, and used without further purification.

Formulations (Inventive and Comparative)

Materials used in the formulations are listed in Tables 3 and 4. Formulations (inventive and comparative) are listed in Tables 5-8. As seen in these tables, there are four sets of formulations containing different carbon black types (N660 and SPHERON 6000).

TABLE 3

Polymer Materials used in Formulations

| | Density (g/cc) | MV (1 + 4, 125° C.) [MU] | ENB Content (wt %) | Chemical Composition | Source |
|---|---|---|---|---|---|
| KELTAN 6160D | 0.87 | 63 | 1.2 | EPDM | ARLANXEO |
| KELTAN 8550C | 0.86 | 80 | 5.5 | EPDM | ARLANXEO |
| KELTAN 8570C | 0.88 | 80 | 5.0 | EPDM | ARLANXEO |
| VISTALON 7500 | 0.86 | 82 | 5.7 | EPDM | ExxonMobil Chemical |
| NORDEL 4570 | 0.86 | 70 | 4.9 | EPDM | Dow |
| NORDEL 4770 | 0.88 | 70 | 4.9 | EPDM | Dow |
| NORDEL 3745 | 0.88 | 45 | 0.5 | EPDM | Dow |
| NORDEL 3760 | 0.88 | 63 | 2.2 | EPDM | Dow |
| EPDM01 | 0.87 | 90 | 0.6 | EPDM | Dow |
| EPDM02 | 0.86 | 90 | 0.3 | EPDM | Dow |
| ENGAGE HM 7487 | 0.86 | 47 | 0.0 | Ethylene-Octene copolymer | Dow |

TABLE 4

Chemical Materials used in Formulations

| | Chemical Composition | Source | Function |
|---|---|---|---|
| MAGLITE D | MgO | HallStar Company | Acid acceptor |
| SUNPAR 2280 | Paraffinic Oil | HollyFrontier | oil |
| OMYA 2T-FL | CALCIUM CARBONATE | OMYA | Filler |
| C.B. N660 | CARBON BLACK | Cabot | Reinforcing Filler |
| C.B. SPHERON 6000 | CARBON BLACK | Cabot | Reinforcing Filler |
| CARBOWAX PEG 3350 | Polyethylene glycol | Dow Chemical | Process aid/ curing activator |
| STEARIC ACID F-2000 | STEARIC ACID | Harwick Standard | Curing activator |
| VULCUP 40KE | di-(tert-butylperoxy-isopropyl)benzene | Arkema | Peroxide curing agent |
| SARET SR 517 HPD | | Sartomer | Curing coagent |
| VANOX CDPA | 4,4'-Bis (alpha, alpha-dimethylbenzyl) diphenylamine | RT Vanderbilt | Primary AO |
| VANOX MTI | 2-mercaptotoluimidazole | RT Vanderbilt | Synergist AO |

TABLE 5

First Set of Formulations with Carbon Black N660 (amounts in weight parts)

| | Comp. 1 | Inv. 2 | Inv. 3 | Inv. 4 | Inv. 5 | Inv. 6 | Comp. 5 |
|---|---|---|---|---|---|---|---|
| NORDEL IP 3745P | 50 | | 100 | 50 | | 100 | 100 |
| ENGAGE HM 7487 | 50 | 100 | | 50 | 100 | | |
| MAGLITE D | | 10 | 20 | 10 | 20 | 20 | |
| SUNPAR 2280 | 60 | 80 | 80 | 60 | 40 | 40 | 40 |
| OMYA 2T-FL | 20 | 20 | 20 | 20 | 20 | 20 | 20 |
| C.B. N660 | 100 | 80 | 60 | 80 | 60 | 100 | 60 |
| CARBOWAX PEG 3350 | 2 | 2 | 2 | 2 | 2 | 2 | 2 |
| STEARIC ACID F-2000 | 1.5 | 1.5 | 1.5 | 1.5 | 1.5 | 1.5 | 1.5 |
| VULCUP 40KE | 7.5 | 7.5 | 7.5 | 7.5 | 7.5 | 7.5 | 7.5 |
| SARET SR 517 HPD | 6 | 6 | 6 | 6 | 6 | 6 | 6 |
| VANOX CDPA | 1 | 1 | 1 | 1 | 1 | 1 | 1 |
| VANOX MTI | 2 | 2 | 2 | 2 | 2 | 2 | 2 |
| Total | 300.0 | 310.0 | 300.0 | 290.0 | 260.0 | 300.0 | 240.0 |
| wt % of diene (ENB), based on the wt of component A | 0.25 | 0 | 0.5 | 0.25 | 0 | 0.5 | 0.5 |

TABLE 5-continued

First Set of Formulations with Carbon Black N660 (amounts in weight parts)

|  | Comp. 1 | Inv. 2 | Inv. 3 | Inv. 4 | Inv. 5 | Inv. 6 | Comp. 5 |
|---|---|---|---|---|---|---|---|
| Value for Eqn. 1* | −20.5 | 12 | 37 | 9.5 | 42 | 37 | −23 |
| Density of component A** | 0.870 | 0.860 | 0.880 | 0.870 | 0.860 | 0.880 | 0.880 |
| Mooney Viscosity of component A(1 + 4, 125° C.)*** | 46.0 | 47.0 | 45.0 | 46.0 | 47.0 | 45.0 | 45.0 |

*Eqn. 1 = {[−10 (wt %)$^{-1}$ * (diene is wt % (based on wt of component A) − 0.9 wt %)] + [3 (phr)$^{-1}$ * (acid acceptor (in phr) − 9 phr)]}

**Density = $\dfrac{100}{\sum[(\text{Component } A_i \text{ Phr})/(\text{Density of } A_i)]}$.

***Mooney Visc. = $\text{EXP}\left(\sum \ln\left((MV \text{ of } A_i) \times \dfrac{\text{Component } A_i \text{ Phr}}{100}\right)\right)$.

TABLE 6

Second Set of Formulations with Carbon Black SPHERON 6000 (amounts in weight parts)

|  | Inv. 1 | Comp. 2 | Comp. 3 | Inv. 7 | Comp. 4 | Inv. 8 |
|---|---|---|---|---|---|---|
| NORDEL IP 3745P | 100 | 50 |  |  | 100 | 100 |
| ENGAGE HM 7487 |  | 50 | 100 | 100 |  |  |
| MAGLITE D | 20 |  |  | 20 |  | 20 |
| SUNPAR 2280 | 40 | 80 | 40 | 60 | 80 | 80 |
| OMYA 2T-FL | 20 | 20 | 20 | 20 | 20 | 20 |
| C.B. SPHERON 6000 | 60 | 60 | 80 | 100 | 100 | 100 |
| CARBOWAX PEG 3350 | 2 | 2 | 2 | 2 | 2 | 2 |
| STEARIC ACID F-2000 | 1.5 | 1.5 | 1.5 | 1.5 | 1.5 | 1.5 |
| VULCUP 40KE | 7.5 | 7.5 | 7.5 | 7.5 | 7.5 | 7.5 |
| SARET SR 517 HPD | 6 | 6 | 6 | 6 | 6 | 6 |
| VANOX CDPA | 1 | 1 | 1 | 1 | 1 | 1 |
| VANOX MTI | 2 | 2 | 2 | 2 | 2 | 2 |
| Total | 260.0 | 280.0 | 260.0 | 320.0 | 320.0 | 340.0 |
| wt % of diene (ENB), based on the wt of component A | 0.5 | 0.25 | 0 | 0 | 0.5 | 0.5 |
| Value for Eqn. 1* | 37 | −20.5 | −18 | 42 | −23 | 37 |
| Density of component A** | 0.880 | 0.870 | 0.860 | 0.860 | 0.880 | 0.880 |
| Mooney Viscosity of component A (1 + 4, 125C)*** | 45.0 | 46.0 | 47.0 | 47.0 | 45.0 | 45.0 |

*, , *-See footnotes to Table 5.

TABLE 7

Third Set of Formulations with Carbon Black N660 (amounts in weight parts)

|  | Comp 6 | Inv 9 | Comp 7 | Comp 8 | Comp 9 | Comp 10 | Comp 11 | Comp 12 | Comp 13 |
|---|---|---|---|---|---|---|---|---|---|
| KELTAN 6160D | 100 | 100 |  |  |  |  |  |  |  |
| KELTAN 8550C |  |  | 70 | 70 |  |  |  |  |  |
| KELTAN 8570C |  |  | 30 | 30 |  |  |  |  |  |
| VISTALON 7500 |  |  |  |  | 100 | 100 |  |  |  |
| NORDEL 4570 |  |  |  |  |  |  |  | 40 | 40 |
| NORDEL 4770 |  |  |  |  |  |  |  | 60 | 60 |
| EPDM01 |  |  |  |  |  |  |  |  | 100 |
| MAGLITE ® D |  | 10 |  | 10 |  | 10 |  |  |  |
| SUNPAR 2280 | 55 | 55 | 55 | 55 | 55 | 55 | 55 | 55 | 55 |
| OMYA 2T-FL | 20 | 20 | 20 | 20 | 20 | 20 | 20 | 20 | 20 |
| C.B. N660 | 84 | 84 | 84 | 84 | 84 | 84 | 84 | 84 | 84 |
| VULCUP 40KE | 7.5 | 7.5 | 7.5 | 7.5 | 7.5 | 7.5 | 7.5 | 7.5 | 7.5 |
| SARET SR 517 HPD | 6 | 6 | 6 | 6 | 6 | 6 | 6 | 6 | 6 |
| VANOX CDPA | 1 | 1 | 1 | 1 | 1 | 1 |  | 1 | 1 |
| VANOX MTI | 2 | 2 | 2 | 2 | 2 | 2 |  | 2 | 2 |
| Total | 275.5 | 285.5 | 275.5 | 285.5 | 275.5 | 285.5 | 272.5 | 275.5 | 275.5 |
| wt % of diene (ENB), based on the wt of component A | 1.2 | 1.2 | 5.35 | 5.35 | 5.70 | 5.70 | 5 | 5 | 0.6 |
| Value for Eqn. 1* | −30 | 0 | −71.5 | −41.5 | −75 | −45 | −68 | −68 | −24 |

TABLE 7-continued

Third Set of Formulations with Carbon Black N660 (amounts in weight parts)

|  | Comp 6 | Inv 9 | Comp 7 | Comp 8 | Comp 9 | Comp 10 | Comp 11 | Comp 12 | Comp 13 |
|---|---|---|---|---|---|---|---|---|---|
| Density of component A** | 0.870 | 0.870 | 0.870 | 0.870 | 0.860 | 0.860 | 0.870 | 0.870 | 0.870 |
| Mooney Viscosity of component A(1 + 4, 125C)*** | 63.0 | 63.0 | 80.0 | 80.0 | 82.0 | 82.0 | 70.0 | 70.0 | 90.0 |

*, , *-See footnotes to Table 5.

TABLE 8

Fourth Set of Formulations with Carbon Black N660 (amounts in weight parts)

|  | Inv 10 | Inv 11 | Inv 12 | Inv 13 | Inv 14 | Comp 14 | Inv. 15 | Inv 16 | Inv 17 |
|---|---|---|---|---|---|---|---|---|---|
| KELTAN 6160D |  |  |  |  |  |  |  |  |  |
| KELTAN 8550C |  |  |  |  |  |  |  |  |  |
| KELTAN 8570C |  |  |  |  |  |  |  |  |  |
| VISTALON 7500 |  |  |  |  |  |  |  |  |  |
| NORDEL 4570 A |  |  |  |  |  | 40 |  |  |  |
| NORDEL 4770 |  |  |  |  |  | 60 | 60 |  |  |
| NORDEL 3745 (0.5% ENB) |  |  |  |  |  |  |  |  | 60 |
| NORDEL 3760 (2.2% ENB) |  |  |  |  |  |  |  | 60 |  |
| EPDM01 | 100 | 100 | 80 | 60 |  |  |  |  |  |
| EPDM02 |  |  | 20 | 40 | 100 |  | 40 | 40 | 40 |
| MAGLITE ® D | 10 | 20 | 20 | 20 | 20 | 20 | 20 | 20 | 20 |
| SUNPAR 2280 | 55 | 55 | 55 | 55 | 55 | 55 | 55 | 55 | 55 |
| OMYA 2T-FL | 20 | 20 | 20 | 20 | 20 | 20 | 20 | 20 | 20 |
| C.B. N660 | 84 | 84 | 84 | 84 | 84 | 84 | 84 | 84 | 84 |
| VULCUP 40KE | 7.5 | 7.5 | 7.5 | 7.5 | 7.5 | 7.5 | 7.5 | 7.5 | 7.5 |
| SARET SR 517 HPD | 6 | 6 | 6 | 6 | 6 | 6 | 6 | 6 | 6 |
| VANOX CDPA | 1 | 1 | 1 | 1 | 1 | 1 | 1 | 1 | 1 |
| VANOX MTI | 2 | 2 | 2 | 2 | 2 | 2 | 2 | 2 | 2 |
| TOTAL | 285.5 | 295.5 | 295.5 | 295.5 | 295.5 | 295.5 | 295.5 | 295.5 | 295.5 |
| wt % of diene (ENB), based on the weight of component A | 0.60 | 0.60 | 0.54 | 0.47 | 0.28 | 5.00 | 3.11 | 1.43 | 0.41 |
| Value for Eqn. 1* | 6 | 36 | 36.6 | 37.3 | 39.2 | −8 | 10.9 | 27.7 | 37.9 |
| Density of component A** | 0.870 | 0.870 | 0.868 | 0.866 | 0.860 | 0.872 | 0.872 | 0.872 | 0.872 |
| Mooney Viscosity of component A(1 + 4, 125C)*** | 90.0 | 90.0 | 90.0 | 90.0 | 90.0 | 70.0 | 77.4 | 72.7 | 59.4 |

*, , *-See footnotes to Table 2.

Compounding and Mixing

Each formulation (composition) was mixed in a rubber internal mixer, i.e., a Banbury lab mixer BR 1600 (batch mixer), in accordance to ASTM D 3182. The mixer was equipped with a pair of 2-wing rotors. The batch weight was sized to a 75 vol % fill factor in the mixer bowl. The rotor speed was kept constant at 50 rpm during the mixing cycle (approx. 5 mins total mixing time). A thermocouple was used to measure the melt temperature of the mixture. A standard "up-side down" mixing procedure was used, with carbon black, $CaCO_3$, Maglite D, PEG 3350, stearic acid, VANOX CDPA, and VANOX MTI added first to the bowl; followed by oil (SUNPAR 2280), and the polymer(s) added last. When the temperature of the mixture reach 85° C., the peroxide curative system (VULCUP 40KE, SARET SR 517 HP) was added into the mix. Once the melt temperature reached 105° C., the final compounded mixture was dropped into a catch pan. The mixture was transferred to a RELIABLE 6 inch, two roll mill. Mixing was completed on the two roll mill at ambient conditions, by cigar-rolling the compound batch, five times through the two roll mill, to form a compound sheet (sheet (uncured) thickness of about 0.09 inch).

Properties of the Formulations (Rheology and Mechanical)
Mooney Viscosity

The Mooney viscosity of each formulated composition was measured using a sample take from an uncured compound sheet, so that the viscosity of the uncured composition could be examined. Mooney Viscosity (ML1+4 at 100° C.) was measured in accordance with ASTM 1646, with a one minute preheat time, and a four minutes rotor operation time. The instrument was an Alpha Technologies Mooney Viscometer 2000.

MDR Analysis

The cure kinetic profiles of each formulation (composition), at 180° C., was measured, using an Alpha Technology Moving Die Rheometer (MDR), in accordance with ASTM D5289. The MDR test was carried out at 180° C., over a period of 30 minutes. The rheology or curve of torque, as a function of time, for each formulated composition was measured, at a temperature of 180° C., from samples of an uncured sheet (curing profile as a function of time (at 180° C.). The viscoelastic properties, such as minimum S' torque (ML), maximum S' torque (MH; or 100% cure), and time to reach a certain percentage of the cure state (for example, t95, which corresponds to the time, in minutes, to reach the 95% state of cure), were measured during the cure cycle. Results are shown in Tables 9-12.

TABLE 9

Compound Properties of First Set of Formulations

| | Comp 1 | Inv 2 | Inv 3 | Inv 4 | Inv 5 | Inv 6 | Comp 5 |
|---|---|---|---|---|---|---|---|
| Mooney Viscosity Test | | | | | | | |
| ML(1 + 4, 100° C.) [MU] | 41.1 | 23.8 | 25.7 | 34.6 | 45.5 | 75.2 | 42.1 |
| MDR | | | | | | | |
| Test temp [° C.] | 180 | 180 | 180 | 180 | 180 | 180 | 180 |
| Test time [min] | 30 | 30 | 30 | 30 | 30 | 30 | 30 |
| ML [dNm] | 1.14 | 0.55 | 0.6 | 0.82 | 0.91 | 2.39 | 1.08 |
| MH [dNm] | 11.44 | 6.46 | 8.33 | 9.75 | 12.06 | 22.8 | 12.81 |
| dS' [dNm] | 10.3 | 5.91 | 7.73 | 8.93 | 11.15 | 20.41 | 11.73 |
| ts1 [min] | 0.54 | 0.85 | 0.78 | 0.63 | 0.5 | 0.42 | 0.56 |
| ts2 [min] | 0.77 | 1.33 | 1.15 | 0.92 | 0.68 | 0.51 | 0.75 |
| t10 [min] | 0.54 | 0.66 | 0.69 | 0.6 | 0.52 | 0.51 | 0.59 |
| t50 [min] | 1.65 | 1.77 | 1.73 | 1.66 | 1.41 | 1.5 | 1.54 |
| t90 [min] | 3.97 | 4.12 | 4.14 | 4.09 | 3.65 | 4.16 | 4.2 |
| t95 [min] | 5.2 | 5.47 | 5.65 | 5.49 | 5.1 | 5.62 | 5.77 |

TABLE 10

Compound Properties of Second Set of Formulations

| | Inv 1 | Comp 2 | Comp 3 | Inv 7 | Comp 4 | Inv 8 |
|---|---|---|---|---|---|---|
| Mooney Viscosity Test | | | | | | |
| ML(1 + 4, 100° C.) [MU] | 48.2 | 19.8 | 44.7 | 43.4 | 29.3 | 32.7 |
| MDR | | | | | | |
| Test temp [° C.] | 180 | 180 | 180 | 180 | 180 | 180 |
| Test time [min] | 30 | 30 | 30 | 30 | 30 | 30 |
| ML [dNm] | 1.09 | 0.33 | 0.98 | 0.93 | 0.72 | 0.76 |
| MH [dNm] | 15.74 | 4.81 | 11.58 | 10.84 | 8.18 | 9.22 |
| dS' [dNm] | 14.65 | 4.48 | 10.6 | 9.91 | 7.46 | 8.46 |
| ts1 [min] | 0.45 | 1.18 | 0.54 | 0.55 | 0.74 | 0.7 |
| ts2 [min] | 0.62 | 1.82 | 0.76 | 0.81 | 1.14 | 1.07 |
| t10 [min] | 0.52 | 0.75 | 0.55 | 0.55 | 0.65 | 0.64 |
| t50 [min] | 1.39 | 1.97 | 1.52 | 1.55 | 1.78 | 1.75 |
| t90 [min] | 4.59 | 4.74 | 4.02 | 3.74 | 4.33 | 4.31 |
| t95 [min] | 6.61 | 6.5 | 5.57 | 5.06 | 5.73 | 5.88 |

TABLE 11

Compound Properties of Third Set of Formulations

| | Comp 6 | Inv 9 | Comp 7 | Comp 8 | Comp 9 | Comp 10 | Comp 11 | Comp 12 | Comp 13 |
|---|---|---|---|---|---|---|---|---|---|
| ML(1 + 4, 100° C.) | 51.7 | 58.4 | 56.6 | | | 62.2 | 55.4 | 55.0 | 71.8 |
| MDR | | | | | | | | | |
| ML [dNm] | 1.51 | 1.77 | 1.62 | 1.74 | 1.55 | 1.78 | 1.46 | 1.48 | 1.91 |
| MH [dNm] | 13.71 | 14.73 | 15.64 | 16.23 | 13.22 | 14.34 | 19.87 | 15.53 | 13.90 |
| dS' [dNm] | 12.20 | 12.96 | 14.02 | 14.49 | 11.67 | 12.56 | 18.42 | 14.05 | 11.99 |
| ts1 [min] | 0.49 | 0.45 | 0.48 | 0.48 | 0.54 | 0.51 | 0.36 | 0.47 | 0.46 |
| ts2 [min] | 0.65 | 0.62 | 0.62 | 0.63 | 0.74 | 0.69 | 0.46 | 0.61 | 0.58 |
| t10 [min] | 0.52 | 0.50 | 0.53 | 0.55 | 0.57 | 0.55 | 0.44 | 0.53 | 0.48 |
| t50 [min] | 1.41 | 1.38 | 1.44 | 1.48 | 1.55 | 1.52 | 1.17 | 1.43 | 1.29 |
| t90 [min] | 3.59 | 3.56 | 4.00 | 4.19 | 4.23 | 4.23 | 3.94 | 4.02 | 3.20 |
| t95 [min] | 4.91 | 4.85 | 5.52 | 5.71 | 5.72 | 5.72 | 5.44 | 5.44 | 4.23 |

TABLE 12

Compound Properties of Fourth Set of Formulations

| | Inv 10 | Inv 11 | Inv 12 | Inv 13 | Inv 14 | Comp 14 | Inv 15 | Inv 16 | Inv 17 |
|---|---|---|---|---|---|---|---|---|---|
| ML(1 + 4, 100° C.) [MU] | 76.2 | 81.4 | 82.6 | 83.1 | 80.4 | 68.8 | 75 | 72.5 | 59.8 |
| MDR | | | | | | | | | |
| ML [dNm] | 2.17 | 2.35 | 2.51 | 2.47 | 2.66 | 1.90 | 2.14 | 2.15 | 1.78 |
| MH [dNm] | 15.39 | 15.63 | 15.82 | 15.13 | 13.78 | 18.37 | 17.57 | 15.83 | 13.80 |
| dS' [dNm] | 13.22 | 13.29 | 13.31 | 12.66 | 11.12 | 16.47 | 15.44 | 13.68 | 12.02 |
| ts1 [min] | 0.41 | 0.39 | 0.40 | 0.38 | 0.42 | 0.42 | 0.41 | 0.42 | 0.44 |
| ts2 [min] | 0.53 | 0.53 | 0.54 | 0.54 | 0.60 | 0.56 | 0.56 | 0.59 | 0.66 |

TABLE 12-continued

Compound Properties of Fourth Set of Formulations

|  | Inv 10 | Inv 11 | Inv 12 | Inv 13 | Inv 14 | Comp 14 | Inv 15 | Inv 16 | Inv 17 |
|---|---|---|---|---|---|---|---|---|---|
| t10 [min] | 0.45 | 0.44 | 0.44 | 0.42 | 0.44 | 0.51 | 0.49 | 0.48 | 0.49 |
| t50 [min] | 1.24 | 1.24 | 1.26 | 1.17 | 1.26 | 1.38 | 1.30 | 1.29 | 1.42 |
| t90 [min] | 3.05 | 3.02 | 3.00 | 2.80 | 2.81 | 4.05 | 3.63 | 3.32 | 3.51 |
| t95 [min] | 4.08 | 4.10 | 4.00 | 3.81 | 3.61 | 5.52 | 4.98 | 4.54 | 4.75 |

Compression Molded Plaques—Each Plaque (6 in×6 in×0.077 in)

The mechanical properties of each formulation was measured from the vulcanized sheets, cured in a compression molder (for tensile properties and Shore A Hardness).

Samples from the uncured compound sheet were each cut, slightly smaller than 6×6 inches, depending on the thickness of the sheet. The sample weight will depend on the specific gravity of the compound. The mill direction was marked, and the sample was labeled. The mold was spray brushed with CAMIE 999 Dry Silicone Spray from Camie-Campbell. The mold (6 in.×6 in×0.077 in) was placed on a platen, and preheated to 180° C. The sample was carefully placed in the preheated mold. The platens were closed. To vulcanize the samples, the samples were under a minimum compression pressure of 3.5 MPa (500 psi) at 180° C., using the "t95 data plus 3 minutes" for each plaque. When the cure time ended (t95 data plus 3 minutes), the bottom platen automatically opened. The sample, in the mold, was removed, and immediately placed in water (room temperature) to stop the curing. Each cured sample was conditioned for at least 18 hours, in air, at room temperature, prior to testing.

Vulcanizates Physical Properties (Original and Aged Properties)

After curing, each cured specimen/vulcanizate was conditioned for at least 18 hours, at ambient conditions before testing. Properties are listed in Tables 13-20 below.

Tensile Stress—Strain Properties and Shore A Hardness Properties

Original tensile properties were measured using specimens that were die cut from the cured plaque, as described above, using a "dumbbell" shaped tensile die, having the dimensions described in ASTM D-412. Three die cut specimens were cut from one plaque.

For heat aged tensile properties measurement, the test specimens were first die cut from the cured plague, as described above, using the "dumbbell" shaped tensile die. Those fabricated test specimens were then aged in an air ventilated oven at 150° C., at the desired aging hours. The heat aged tensile properties were then measured using those heat aged test specimens. Tensile properties (tensile strength and elongation) were measured at room temperature, following the method ASTM D-412 and ASTM D-573.

Shore A hardness properties were measured using a stacked of three, die cut specimens (dumbbell), each having the dimensions described in ASTM D-412. Three die cut specimens were cut from the compression molded plaque, prepared as described above. Shore A hardness properties were measured at room temp., following the method ASTM D-2240.

It has been discovered that the inventive formulations (compositions) have improved long term heat aging properties. It is discovered that the low ENB content of polymer component in the composition reduced the rate of thermal degradation of the rubber compound during the aging process. It has also been discovered that the addition of magnesium oxide or zinc oxide, to the composition also contribute to improve the long term heat aging. Excellent long term heat aging properties can be achieved by the inventive compositions.

TABLE 13

Original Physical Properties of Vulcanizates of First Set Formulations

|  | Comp 1 | Inv 2 | Inv 3 | Inv 4 | Inv 5 | Inv 6 | Comp 5 |
|---|---|---|---|---|---|---|---|
| Stress @ 50% Strain (MPa) | 1.8 | 1.1 | 1.4 | 1.5 | 1.7 | 3.5 | 2.0 |
| Stress @ 100% Strain (MPa) | 2.6 | 1.5 | 1.8 | 2.1 | 2.3 | 5.3 | 2.6 |
| Stress @ 300% Strain (MPa) | 7.1 | 3.5 | 4.0 | 5.6 | 5.4 | 3.5 | 7.1 |
| Elongation at Break (%) | 422 | 808 | 683 | 619 | 560 | 267 | 504 |
| Tensile Strength (MPa) | 8.8 | 8.2 | 9.2 | 10.2 | 9.1 | 11.4 | 10.8 |
| Shore A Hardness | 72 | 58 | 63 | 66 | 69 | 85 | 73 |

TABLE 14

Original Physical Properties of Vulcanizates of Second Set Formulations

|  | Inv 1 | Comp 2 | Comp 3 | Inv 7 | Comp 4 | Inv 8 |
|---|---|---|---|---|---|---|
| Stress @ 50% Strain (MPa) | 2.1 | 1.1 | 1.7 | 1.8 | 1.7 | 1.9 |
| Stress @ 100% Strain (MPa) | 2.8 | 1.4 | 2.6 | 2.5 | 2.4 | 2.6 |
| Stress @ 300% Strain (MPa) | 6.8 | 3.0 | 6.4 | 5.7 | 5.8 | 6.2 |
| Elongation at Break (%) | 517 | 861 | 603 | 534 | 582 | 541 |
| Tensile Strength (MPa) | 9.7 | 7.8 | 9.2 | 7.5 | 8.0 | 8.0 |
| Shore A Hardness | 75 |  | 68 | 70 | 69 | 71 |

TABLE 15

Original Physical Properties of Vulcanizates of Third Set Formulations

|  | Comp 6 | Inv-9 | Comp 7 | Comp 8 | Comp 9 | Comp 10 | Comp 11 | Comp 12 | Comp 13 |
|---|---|---|---|---|---|---|---|---|---|
| Stress @ 50% Strain (MPa) | 1.4 | 1.5 | 1.5 | 1.5 | 1.4 | 1.4 | 2.2 | 1.8 | 1.6 |
| Stress @ 100% Strain (MPa) | 2.3 | 2.5 | 2.7 | 2.7 | 2.4 | 2.5 | 4.1 | 2.9 | 2.4 |
| Stress @ 300% Strain (MPa) | 8.1 | 7.9 | 10.9 | 9.9 | 8.8 | 8.5 | 2.0 | 9.3 | 7.7 |

TABLE 15-continued

Original Physical Properties of Vulcanizates of Third Set Formulations

|  | Comp 6 | Inv-9 | Comp 7 | Comp 8 | Comp 9 | Comp 10 | Comp 11 | Comp 12 | Comp 13 |
|---|---|---|---|---|---|---|---|---|---|
| Elongation at Break (%) | 447 | 412 | 352 | 343 | 358 | 372 | 259 | 403 | 421 |
| Tensile Strength (MPa) | 11.5 | 10.3 | 13.2 | 11.8 | 11.5 | 11.7 | 13.9 | 13.0 | 10.0 |
| Shore A Hardness | 62 | 64 | 61 | 63 | 59 | 61 | 68 | 67 | 65 |

TABLE 16

Original Physical Properties of Vulcanizates of Fourth Set Formulations

|  | Inv-10 | Inv-11 | Inv-12 | Inv-13 | Inv-14 | Comp-14 | Inv-15 | Inv-16 | Inv-17 |
|---|---|---|---|---|---|---|---|---|---|
| Stress @ 50% Strain (MPa) | 1.7 | 1.8 | 1.7 | 1.5 | 1.1 | 1.6 | 2.3 | 2.1 | 1.4 |
| Stress @ 100% Strain (MPa) | 2.6 | 2.7 | 2.6 | 2.2 | 1.7 | 2.3 | 3.8 | 3.5 | 2.4 |
| Stress @ 300% Strain (MPa) | 7.4 | 7.5 | 7.3 | 6.6 | 5.6 | 5.5 | 11.0 | 9.8 | 7.7 |
| Elongation at Break (%) | 399 | 366 | 357 | 357 | 413 | 339 | 330 | 356 | 383 |
| Tensile Strength (MPa) | 9.2 | 8.7 | 8.4 | 7.6 | 7.6 | 12.6 | 11.2 | 8.8 | 8.8 |
| Shore A Hardness | 67 | 68 | 67 | 65 | 60 | 72 | 71 | 62 | 68 |

TABLE 17

Heat Aging Properties of Vulcanizates of First Set Formulations

|  |  | Comp.-1 | Inv.-2 | Inv.-3 | Inv.-4 | Inv.-5 | Inv.-6 | Comp.-5 |
|---|---|---|---|---|---|---|---|---|
| Tensile Strength retention (%) | 0 hours (original) |  |  |  |  |  |  |  |
|  | 96 hours | 100% | 91% | 99% | 93% | 94% | 97% | 101% |
|  | 168 hours | 89% | 90% | 97% | 66% | 92% | 99% | 93% |
|  | 238 hours |  |  |  |  |  |  |  |
|  | 305 hours |  |  |  |  |  |  |  |
|  | 336 hours | 69% | 80% | 86% | 69% | 82% | 91% | 80% |
|  | 504 hours | 67% | 86% | 91% | 85% | 88% | 95% | 61% |
|  | 762 hours | 54% | 68% | 71% | 72% | 77% | 86% | 51% |
|  | 1008 hours | 63% | 66% | 69% | 60% | 73% | 85% | 48% |
| Tensile Strength (MPa) | 0 hours (original) | 8.8 | 8.2 | 9.2 | 10.2 | 9.1 | 11.4 | 10.8 |
|  | 96 hours | 8.8 | 7.5 | 9.1 | 9.5 | 8.6 | 11.1 | 11.0 |
|  | 168 hours | 7.8 | 7.4 | 8.9 | 6.7 | 8.4 | 11.3 | 10.1 |
|  | 238 hours |  |  |  |  |  |  |  |
|  | 305 hours |  |  |  |  |  |  |  |
|  | 336 hours | 6.1 | 6.6 | 7.8 | 7.1 | 7.5 | 10.4 | 8.6 |
|  | 504 hours | 5.8 | 7.1 | 8.3 | 8.7 | 8.0 | 10.8 | 6.6 |
|  | 762 hours | 4.7 | 5.6 | 6.5 | 7.4 | 7.1 | 9.8 | 5.5 |
|  | 1008 hours | 5.6 | 5.5 | 6.3 | 6.1 | 6.7 | 9.7 | 5.2 |
| Elongation at break (EB) retention | 0 hours (original) |  |  |  |  |  |  |  |
|  | 96 hours | 91% | 96% | 105% | 96% | 99% | 98% | 89% |
|  | 168 hours | 83% | 102% | 99% | 67% | 98% | 97% | 77% |
|  | 238 hours |  |  |  |  |  |  |  |
|  | 305 hours |  |  |  |  |  |  |  |
|  | 336 hours | 69% | 95% | 95% | 72% | 85% | 84% | 62% |
|  | 504 hours | 47% | 89% | 85% | 80% | 83% | 75% | 31% |
|  | 762 hours | 9% | 82% | 72% | 70% | 73% | 65% | 12% |
|  | 1008 hours | 12% | 79% | 68% | 58% | 73% | 62% | 6% |
| Elongation at break (%) | 0 hours (original) | 422 | 808 | 683 | 619 | 560 | 267 | 504 |
|  | 96 hours | 385 | 773 | 718 | 594 | 554 | 262 | 448 |
|  | 168 hours | 350 | 823 | 677 | 417 | 548 | 258 | 390 |
|  | 238 hours |  |  |  |  |  |  |  |
|  | 305 hours |  |  |  |  |  |  |  |
|  | 336 hours | 291 | 766 | 647 | 446 | 477 | 225 | 311 |
|  | 504 hours | 200 | 719 | 580 | 496 | 464 | 200 | 159 |
|  | 762 hours | 39 | 659 | 489 | 436 | 411 | 173 | 59 |
|  | 1008 hours | 52 | 638 | 467 | 359 | 409 | 167 | 29 |

TABLE 18

Heat Aging Properties of Vulcanizates of Second Set Formulations

| | | Inv.-1 | Comp.-2 | Comp.-3 | Inv.-7 | Comp.-4 | Inv.-8 |
|---|---|---|---|---|---|---|---|
| Tensile Strength retention (%) | 0 hours (original) | | | | | | |
| | 96 hours | 101% | 89% | 94% | 91% | 103% | 86% |
| | 168 hours | 102% | 78% | 86% | 90% | 91% | 94% |
| | 238 hours | | | | | | |
| | 305 hours | | | | | | |
| | 336 hours | 97% | 50% | 75% | 84% | 74% | 91% |
| | 504 hours | 101% | 48% | 66% | 88% | 83% | 95% |
| | 762 hours | 88% | 55% | 61% | 75% | 83% | 81% |
| | 1008 hours | 86% | 74% | 57% | 70% | 89% | 74% |
| Tensile Strength (MPa) | 0 hours | 9.7 | 7.8 | 9.2 | 7.5 | 8.0 | 8.0 |
| | 96 hours | 9.7 | 6.9 | 8.6 | 6.9 | 8.3 | 6.9 |
| | 168 hours | 9.8 | 6.1 | 7.9 | 6.8 | 7.4 | 7.5 |
| | 238 hours | | | | | | |
| | 305 hours | | | | | | |
| | 336 hours | 9.4 | 3.9 | 6.9 | 6.3 | 6.0 | 7.3 |
| | 504 hours | 9.7 | 3.7 | 6.1 | 6.7 | 6.7 | 7.6 |
| | 762 hours | 8.5 | 4.3 | 5.6 | 5.6 | 6.7 | 6.5 |
| | 1008 hours | 8.4 | 5.8 | 5.2 | 5.3 | 7.2 | 5.9 |
| Elongation at break (EB) retention (%) | 0 hours | | | | | | |
| | 96 hours | 99% | 92% | 83% | 94% | 83% | 93% |
| | 168 hours | 91% | 88% | 80% | 98% | 70% | 92% |
| | 238 hours | | | | | | |
| | 305 hours | | | | | | |
| | 336 hours | 91% | 69% | 74% | 90% | 53% | 82% |
| | 504 hours | 70% | 28% | 50% | 78% | 72% | 71% |
| | 762 hours | 59% | 4% | 9% | 74% | 6% | 61% |
| | 1008 hours | 56% | 2% | 7% | 71% | 5% | 52% |
| Elongation at break (%) | 0 hours | 517 | 861 | 603 | 534 | 582 | 541 |
| | 96 hours | 513 | 796 | 503 | 503 | 485 | 503 |
| | 168 hours | 471 | 755 | 485 | 526 | 408 | 496 |
| | 238 hours | | | | | | |
| | 305 hours | | | | | | |
| | 336 hours | 471 | 591 | 446 | 479 | 309 | 444 |
| | 504 hours | 362 | 244 | 301 | 417 | 417 | 384 |
| | 762 hours | 304 | 30 | 55 | 395 | 38 | 330 |
| | 1008 hours | 291 | 20 | 41 | 377 | 26 | 280 |

TABLE 19

Heat Aging Properties of Vulcanizates of Third Set Formulations

| | | Comp-6 | Inv-9 | Comp-7 | Comp-8 | Comp-9 | Comp-10 | Comp-11 | Comp-12 | Comp-13 |
|---|---|---|---|---|---|---|---|---|---|---|
| Shore A Hardness | 0 hours | 62 | 64 | 61 | 63 | 59 | 61 | 68 | 67 | 65 |
| | 168 hours | 65 | 65 | 69 | 70 | 66 | 68 | 73 | 73 | 66 |
| | 1008 hours | 88 | 74 | 93 | 84 | 95 | 87 | 92 | 92 | 80 |
| Hardness Change | 168 hours | 3 | 1 | 8 | 7 | 6 | 7 | 5 | 6 | 2 |
| | 1008 hours | 26 | 10 | 32 | 21 | 36 | 26 | 24 | 25 | 16 |
| Tensile Strength retention (%) | 0 hours | 100% | 100% | 100% | 100% | 100% | 100% | 100% | 100% | 100% |
| | 96 hours | 95% | 102% | 96% | 93% | 93% | 100% | 96% | 98% | 94% |
| | 168 hours | 91% | 99% | 91% | 102% | 95% | 96% | 91% | 96% | 96% |
| | 238 hours | | | 72% | 83% | 66% | 84% | 78% | 72% | 79% |
| | 305 hours | 63% | 89% | | | | | | | |
| | 336 hours | | | 55% | 83% | 44% | 76% | 56% | 59% | 71% |
| | 504 hours | 47% | 81% | | | | | | | |
| | 762 hours | 35% | 57% | | | | | | | |
| | 1008 hours | 37% | 44% | 57% | 56% | 77% | 47% | 42% | 58% | 40% |
| Tensile Strength (MPa) | 0 hours | 11.5 | 10.3 | 13.2 | 11.8 | 11.5 | 11.7 | 13.9 | 13.0 | 10.0 |
| | 96 hours | 10.9 | 10.5 | 12.7 | 11.0 | 10.7 | 11.8 | 13.3 | 12.7 | 9.3 |
| | 168 hours | 10.5 | 10.1 | 11.9 | 12.1 | 10.9 | 11.2 | 12.7 | 12.5 | 9.6 |
| | 238 hours | | | 9.5 | 9.9 | 7.5 | 9.9 | 10.9 | 9.4 | 7.8 |
| | 305 hours | 7.3 | 9.1 | | | | | | | |
| | 336 hours | | | 7.2 | 9.8 | 5.1 | 8.9 | 7.8 | 7.7 | 7.1 |

TABLE 19-continued

Heat Aging Properties of Vulcanizates of Third Set Formulations

| | | Comp-6 | Inv-9 | Comp-7 | Comp-8 | Comp-9 | Comp-10 | Comp-11 | Comp-12 | Comp-13 |
|---|---|---|---|---|---|---|---|---|---|---|
| | 504 hours | 5.4 | 8.3 | | | | | | | |
| | 762 hours | 4.0 | 5.9 | | | | | | | |
| | 1008 hours | 4.2 | 4.5 | 7.5 | 6.6 | 8.8 | 5.5 | 5.9 | 7.5 | 4.0 |
| Elongation at break (EB) retention (%) | 0 hours | 100% | 100% | 100% | 100% | 100% | 100% | 100% | 100% | 100% |
| | 96 hours | 93% | 95% | 77% | 81% | 73% | 79% | 97% | 74% | 95% |
| | 168 hours | 86% | 90% | 66% | 80% | 67% | 71% | 84% | 63% | 94% |
| | 238 hours | | | 51% | 68% | 47% | 43% | 74% | 45% | 84% |
| | 305 hours | 64% | 86% | | | | | | | |
| | 336 hours | | | 28% | 56% | 22% | 50% | 47% | 29% | 71% |
| | 504 hours | 38% | 75% | | | | | | | |
| | 762 hours | 10% | 43% | | | | | | | |
| | 1008 hours | 3% | 26% | 2% | 11% | 1% | 5% | 2% | 2% | 8% |
| Elongation at break (%) | 0 hours | 447 | 412 | 352 | 343 | 358 | 372 | 259 | 403 | 421 |
| | 96 hours | 414 | 390 | 269 | 278 | 263 | 294 | 250 | 300 | 400 |
| | 168 hours | 382 | 372 | 233 | 274 | 240 | 266 | 217 | 256 | 395 |
| | 238 hours | | | 179 | 232 | 167 | 160 | 191 | 181 | 352 |
| | 305 hours | 284 | 355 | | | | | | | |
| | 336 hours | | | 100 | 193 | 79 | 185 | 121 | 118 | 298 |
| | 504 hours | 171 | 308 | | | | | | | |
| | 762 hours | 43 | 179 | | | | | | | |
| | 1008 hours | 11 | 106 | 6 | 39 | 2 | 20 | 4 | 10 | 35 |

TABLE 20

Heat Aging Properties of Vulcanizates of Fourth Set Formulations

| | | Inv-10 | Inv-11 | Inv-12 | Inv-13 | Inv-14 | Comp-14 | Inv-15 | Inv-16 | Inv-17 |
|---|---|---|---|---|---|---|---|---|---|---|
| Shore A Hardness | 0 hours | 67 | 68 | 67 | 65 | 60 | 72 | 71 | 62 | 68 |
| | 168 hours | 70 | 69 | 71 | 69 | 65 | 74 | 74 | 67 | 71 |
| | 1008 hours | 75 | 76 | 75 | 73 | 69 | 86 | 82 | 75 | 76 |
| Hardness Change | 168 hours | 3 | 1 | 4 | 3 | 5 | 2 | 3 | 5 | 3 |
| | 1008 hours | 8 | 7 | 8 | 7 | 10 | 14 | 11 | 13 | 8 |
| Tensile Strength retention (%) | 0 hours | 100% | 100% | 100% | 100% | 100% | 100% | 100% | 100% | 100% |
| | 96 hours | 92% | 93% | 102% | 114% | 102% | 96% | 104% | 98% | 98% |
| | 168 hours | 96% | 101% | 105% | 107% | 100% | 100% | 108% | 104% | 97% |
| | 238 hours | | | | | | 93% | | | |
| | 305 hours | 84% | 91% | 90% | 95% | 89% | | 94% | 93% | 89% |
| | 336 hours | | | | | | 85% | | | |

TABLE 20-continued

Heat Aging Properties of Vulcanizates of Fourth Set Formulations

|  |  | Inv-10 | Inv-11 | Inv-12 | Inv-13 | Inv-14 | Comp-14 | Inv-15 | Inv-16 | Inv-17 |
|---|---|---|---|---|---|---|---|---|---|---|
|  | 504 hours | 75% | 85% | 87% | 88% | 84% |  | 99% | 91% | 86% |
|  | 762 hours | 55% | 75% | 73% | 80% | 72% |  | 72% | 84% | 73% |
|  | 1008 hours | 50% | 66% | 69% | 75% | 62% | 53% | 64% | 74% | 68% |
| Tensile Strength. (MPa) | 0 hours | 9.2 | 8.7 | 8.4 | 7.6 | 7.6 | 12.6 | 11.2 | 8.8 | 8.8 |
|  | 96 hours | 8.5 | 8.1 | 8.5 | 8.7 | 7.7 | 12.1 | 11.6 | 8.7 | 8.6 |
|  | 168 hours | 8.8 | 8.8 | 8.8 | 8.2 | 7.6 | 12.6 | 12.1 | 9.2 | 8.5 |
|  | 238 hours |  |  |  |  |  | 11.7 |  |  |  |
|  | 305 hours | 7.8 | 7.9 | 7.5 | 7.3 | 6.7 |  | 10.6 | 8.2 | 7.8 |
|  | 336 hours |  |  |  |  |  | 10.6 |  |  |  |
|  | 504 hours | 7.0 | 7.4 | 7.3 | 6.8 | 6.3 |  | 11.1 | 8.0 | 7.5 |
|  | 762 hours | 5.1 | 6.5 | 6.1 | 6.1 | 5.4 |  | 8.1 | 7.4 | 6.4 |
|  | 1008 hours | 4.6 | 5.7 | 5.8 | 5.7 | 4.7 | 6.7 | 7.2 | 6.5 | 6.0 |
| Elongation at break (EB) retention (%) | 0 hours | 100% | 100% | 100% | 100% | 100% | 100% | 100% | 100% | 100% |
|  | 96 hours | 91% | 94% | 99% | 102% | 97% | 86% | 90% | 96% | 98% |
|  | 168 hours | 92% | 100% | 98% | 99% | 93% | 79% | 86% | 96% | 92% |
|  | 238 hours |  |  |  |  |  | 73% |  |  |  |
|  | 305 hours | 88% | 94% | 92% | 95% | 91% |  | 83% | 92% | 90% |
|  | 336 hours |  |  |  |  |  | 61% |  |  |  |
|  | 504 hours | 70% | 85% | 80% | 85% | 85% |  | 69% | 78% | 84% |
|  | 762 hours | 44% | 62% | 59% | 71% | 74% |  | 39% | 62% | 63% |
|  | 1008 hours | 30% | 49% | 54% | 60% | 57% | 11% | 27% | 40% | 51% |
| Elongation at break (%) | 0 hours | 399 | 366 | 357 | 357 | 413 | 339 | 330 | 356 | 383 |
|  | 96 hours | 365 | 343 | 353 | 365 | 400 | 293 | 297 | 344 | 374 |
|  | 168 hours | 368 | 367 | 352 | 355 | 385 | 268 | 285 | 342 | 354 |
|  | 238 hours |  |  |  |  |  | 248 |  |  |  |
|  | 305 hours | 350 | 345 | 327 | 340 | 375 |  | 273 | 329 | 346 |
|  | 336 hours |  |  |  |  |  | 206 |  |  |  |
|  | 504 hours | 280 | 313 | 288 | 302 | 350 |  | 229 | 279 | 320 |
|  | 762 hours | 176 | 228 | 212 | 255 | 304 |  | 129 | 221 | 243 |
|  | 1008 hours | 121 | 179 | 193 | 214 | 235 | 38 | 90 | 143 | 196 |

The invention claimed is:

1. A composition comprising at least the following components:

A) one or more ethylene/alpha-olefin interpolymers, which comprise≤3.5 wt % of a non-conjugated diene, based on the weight of the one or more ethylene/alpha-olefin interpolymers;

B) an acid acceptor selected from the following: MgO, ZnO, or combination thereof; and wherein the composition meets the following relationship: $\{[-10$ (wt %)$^{-1}$* (diene in wt % (based on wt of component A)$-0.9$ wt %)]$+[3$ (phr)$^{-1}$* (acid acceptor in phr$-9$ phr)]$\}\geq 0$; and wherein the density of component A ranges from 0.850 to 0.910 g/cc.

2. The composition of claim 1, wherein the one or more ethylene/alpha-olefin interpolymers comprise≤2.0 wt % of a non-conjugated diene, based on the weight of the one or more ethylene/alpha-olefin interpolymers.

3. The composition of claim 1, wherein the weight ratio of component A to component B is from 2.0 to 25.

4. The composition of claim 1, wherein the composition meets the following relationship: $\{[10\ (wt\ \%)^{-1}\ast (diene\ in\ wt\ \%\ (based\ on\ wt\ of\ component\ A) - 0.9\ wt\ \%)] + [3\ (phr)^{-1}\ast acid\ acceptor\ in\ phr - 9\ phr)]\} > 0$.

5. The composition of claim 1, wherein the Mooney Viscosity (ML 1+4, 125° C.) of component A ranges from 10 MU to 150 MU.

6. The composition of claim 1, wherein component A is present in an amount from 20 wt % to 55 wt %, based on the weight of the composition.

7. The composition of claim 1, wherein component A comprises an ethylene/alpha-olefin/diene interpolymer.

8. The composition of claim 7, wherein the ethylene/alpha-olefin/diene interpolymer is an EPDM.

9. The composition of claim 7, wherein the ethylene/alpha-olefin/diene interpolymer is present in an amount ≥95 wt %, based on the weight of component A.

10. The composition of claim 1, wherein the component A comprises an ethylene/alpha-olefin/diene interpolymer and an ethylene/alpha-olefin copolymer.

11. The composition of claim 10, wherein the weight ratio of the ethylene/alpha-olefin/diene interpolymer to the ethylene/alpha-olefin copolymer is from 1.0 to 5.0.

12. The composition of claim 10, wherein the ethylene/alpha-olefin/diene interpolymer is an EPDM.

13. The composition of claim 10, wherein the sum weight of the ethylene/alpha-olefin/diene interpolymer and the ethylene/alpha-olefin copolymer is ≥95 wt %, based on the weight of component A.

14. The composition of claim 1, wherein component A comprises an ethylene/alpha-olefin/diene interpolymer and a second ethylene/alpha-olefin/diene interpolymer that are different in one or more of the following properties: wt % diene (based on the weight of the interpolymer), wt % ethylene (based on the weight of the interpolymer), and/or Mooney Viscosity (ML 1+4, 125° C.).

15. The composition of claim 14, wherein the weight ratio of the ethylene/alpha-olefin/diene interpolymer to the second ethylene/alpha-olefin/diene interpolymer is from 1.0 to 5.0.

16. The composition of claim 14, wherein each ethylene/alpha-olefin/diene interpolymer is, independently, an EPDM.

17. The composition of claim 14, wherein the sum weight of the two ethylene/alpha-olefin/diene interpolymers is ≥95 wt %, based on the weight of component A.

18. The composition of claim 1, wherein component A comprises an ethylene/alpha-olefin copolymer.

\* \* \* \* \*